United States Patent
Badding et al.

(10) Patent No.: US 11,342,649 B2
(45) Date of Patent: May 24, 2022

(54) FLEXIBLE WAVEGUIDES HAVING A CERAMIC CORE SURROUNDED BY A LOWER DIELECTRIC CONSTANT CLADDING FOR TERAHERTZ APPLICATIONS

(71) Applicant: CORNING INCORPORATED, Corning, NY (US)

(72) Inventors: Michael Edward Badding, Campbell, NY (US); Ming-Jun Li, Horseheads, NY (US); Karan Mehrotra, Painted Post, NY (US); Cheng-Gang Zhuang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 17/001,909

(22) Filed: Aug. 25, 2020

(65) Prior Publication Data

US 2021/0063637 A1   Mar. 4, 2021

Related U.S. Application Data

(60) Provisional application No. 62/895,223, filed on Sep. 3, 2019.

(51) Int. Cl.
*H01P 3/16* (2006.01)
*G02B 6/10* (2006.01)
*H01P 11/00* (2006.01)

(52) U.S. Cl.
CPC ............... *H01P 3/16* (2013.01); *G02B 6/102* (2013.01); *H01P 11/006* (2013.01)

(58) Field of Classification Search
CPC .................................. H01P 3/16; H01P 11/006
USPC ........................................................... 333/239
See application file for complete search history.

(56) References Cited

U.S. PATENT DOCUMENTS

| | | | | |
|---|---|---|---|---|
| 4,800,350 A | * | 1/1989 | Bridges et al. | ........... H01P 3/16 333/239 |
| 5,814,262 A | | 9/1998 | Ketcham et al. | |
| 5,889,449 A | * | 3/1999 | Fiedziuszko | ............ H01P 1/203 333/239 |

(Continued)

OTHER PUBLICATIONS

Holloway et al., "A Fully Integrated Broadband Sub-mm Wave Chip-to-Chip Interconnect", IEEE transactions on Microwave Theory and Techniques, vol. 65, No. 7, Jul. 2017, pp. 2373-2386.

(Continued)

*Primary Examiner* — Benny T Lee
(74) *Attorney, Agent, or Firm* — Russell S. Magaziner

(57) ABSTRACT

The THz waveguides disclosed herein are used to transmit signals having a THz frequency in the range from 0.1 THz to 10 THz and include an alumina core surrounded by an optional cladding. The core may have a diameter (D1) in the range from 10 μm to 500 μm and may be comprised of a ceramic ribbon having a dielectric constant (Dk). The optional cladding may have a dielectric constant (Dk) less than the core. The THz waveguides can be formed using a continuous firing process and nano-perforation technology that enables access to a wide form factor range. In one example, rectangular waveguides, or ribbons, may be fabricated in the 10 μm to 200 μm thick range at widths in the range from sub-millimeters to several meters and lengths in the range from millimeters to several hundred meters.

23 Claims, 23 Drawing Sheets

(56) References Cited

U.S. PATENT DOCUMENTS

| | | | |
|---|---|---|---|
| 6,104,264 A * | 8/2000 | Ishikawa et al. | H01P 3/165 333/239 |
| 9,806,372 B2 | 10/2017 | Holme et al. | |
| 10,581,115 B2 | 3/2020 | Badding et al. | |
| 11,111,155 B1 | 9/2021 | Badding et al. | |
| 11,148,321 B2 | 10/2021 | Badding et al. | |
| 2005/0065013 A1 | 3/2005 | Rosenflanz et al. | |
| 2010/0314646 A1 | 12/2010 | Breen et al. | |
| 2014/0079620 A1 | 3/2014 | Panz et al. | |
| 2018/0097268 A1* | 4/2018 | Oster et al. | H01P 3/16 |
| 2019/0013562 A1* | 1/2019 | Rusch et al. | H01P 3/16 |

OTHER PUBLICATIONS

Invitation To Pay Additional Fees of the International Searching Authority; PCT/US2020/048971; dated Nov. 26, 2020; 22 Pages; European Patent Office.

Khelkhal et al., "Determination of effective optical constants of infared $CO_2$ waveguide laser materials", Applied optics, vol. 31, No. 21, Jul. 20, 1992, p. 4175.

Yang et al., "On-Wafer Terahertz Ribbon Waveguides Using Polymer-Ceramic Nanocomposites", IEEE Transactions on Components, vol. 5, No. 2, Feb. 1, 2015, pp. 245-255.

Yeh et al., "Communication at Millimetre-Submillimetre Wavelengths using a Ceramic Ribbon", Letters to Nature, vol. 404, Apr. 6, 2000, pp. 584-588.

Yeh et al., "Low-Loss Terahertz Ribbon Waveguides", Applied optics, vol. 44, No. 28, Oct. 1, 2005, pp. 5937-5946.

* cited by examiner

FLEXIBLE WAVEGUIDES HAVING A CERAMIC CORE SURROUNDED BY A LOWER DIELECTRIC CONSTANT CLADDING FOR TERAHERTZ APPLICATIONS

CROSS-REFERENCE TO RELATED PATENT APPLICATION

The present application claims the benefit of and priority to U.S. Application No. 62/895,223, filed on Sep. 3, 2019, which is incorporated herein by reference in its entirety.

BACKGROUND

Optical communication systems typically operate at the near-infrared bands of the electromagnetic spectrum having wavelengths on the order of 800 nm to 2000 nm. Other types of communication systems such as cell phone systems operate at radio-wave band of the electromagnetic (EM) spectrum from about 3 kHz to 60 GHz, with plans to extend this range into the microwave and millimeter bands, which extend up to about 300 GHz. The move to higher and higher RF and microwave frequencies has been enabled in part by developments in state of the art complementary metal-oxide-semiconductor ("CMOS")-based EM radiation sources and receivers that can operate at frequencies greater than 100 GHz.

The terahertz wavelength range of the EM spectrum is generally considered to range from 0.1 THz (=100 GHz) to 10 THz (10,000 GHz), where the corresponding free-space wavelength ($\lambda 0$) is in the range from 3 mm to 0.03 mm. In a dielectric material with the real part of the dielectric constant $\varepsilon'$, the wavelength $\lambda$ is given by $\lambda=\lambda 0/(\varepsilon')^{1/2}$. More generally, the dielectric constant is expressed as $\varepsilon=\varepsilon'+i\varepsilon''$ where $\varepsilon''$, is the imaginary or lossy part of the dielectric constant. Terahertz ("THz") waveguides can be formed from a guiding structure in which the real part of the dielectric constant is higher than that of the surrounding material or space. Such waveguides can be used to confine and transport a THz optical signal from a source location to a receiver location.

The sub-mm wave or THz band (i.e., having a wavelength between 0.1 mm-1 mm) is one of the least explored sections of the electromagnetic spectrum. This is due to the historical cost of sources and detectors and a lack of a low-loss guiding structures, equivalent to an optical fiber that may be used with visible and infrared wavelengths. Traditional microstrip line circuits, or metallic waveguides at microwave frequencies are generally insufficient to support low loss THz band propagation because high-frequency signals may be absorbed by the materials. Similarly dielectric waveguide for millimeter waves have generally been lossy due to radiation and/or subject to dispersion and have been difficult to costly to use. Even the modern surface plasmon polariton waveguides are too lossy for long-distance transmission in THz bands.

Most THz waveguides are made of a metal or a plastic and are not made of ceramic materials due to physical challenges in forming ceramic waveguides. While fused silica glass has relatively good transmission at THz frequencies, it is relatively fragile as compared to metal and plastic and therefore makes it difficult to form a commercially viable THz waveguide product. Said differently, a commercially viable THz waveguide product needs to have both sufficiently low loss in the THz frequency range and be mechanically robust so that the THz frequency can be handled for manufacturing and operate for extended periods of time in a wide range of environments.

Yeh et al. has proposed a concept for overcoming this drawback and describes a new family of an ultra-low-loss rectangular single-mode waveguide structure for propagating THz signals, which has an attenuation constant more than 100x less than that of a conventional dielectric or metallic waveguide. Cavour Yeh et al., *Low-Loss Terahertz Ribbon Waveguides,* 44 APPLIED OPTICS 28, 5937 (2005); Cavour Yeh et al., *Communication at Millimetre-Submillimetre Wavelengths Using a Ceramic Ribbon,* 404 NATURE 584 (2000). The material Yeh et al. uses is a high purity alumina "rectangular rod" (99.8% purity, 10:1 aspect ratio with 0.635 mm in thickness, 6.35 mm in width and 910 mm in length), operated in 30-40 GHz. However, the thickness of the rectangular rod limits its application in higher frequency signals and its flexibility.

In some aspects, waveguides may be used as a transmission line to guide electromagnetic waves. For example, waveguides may confine electromagnetic waves to propagate in one dimension such that the waves lose a reduced amount of power as it propagates during transmission. Waveguides may be configured for the transmission of electromagnetic waves at different wavelengths. For example, waveguides may be configured to transmit electromagnetic wavelengths within the visible, infrared, radio, microwave, or terahertz bands of the electromagnetic spectrum. Waveguides may be designed to minimize loss (e.g., dissipation of energy) while maintaining flexibility, specific dimensions, shape, or the other properties for the desired end use. In some examples, waveguides configured to guide electromagnetic waves within a certain band of the electromagnetic spectrum may be different than waveguides configured to guide electromagnetic waves within a different band of the electromagnetic spectrum. In this way, waveguides may be designed (e.g., shape, dimensions, material, or the like) to optimize performance based on the wavelengths of the electromagnetic spectrum the waveguide is intended to transmit.

Applicant's cutting-edge technology, continuous firing process, and ribbon ceramics products offer the manufacturing of an ultra-high purity alumina ribbon waveguide with an extremely thin form factor and long length. The attributes of Applicant's waveguides provide for an ideal solution for THz communication and could address the drawbacks mentioned above. These attributes include, but are not limited to, an ultrahigh purity alumina that enables great dielectric performance, a fine grain size that provides for excellent flexibility and mechanical strength, a thin form factor, and a long length.

SUMMARY OF THE INVENTION

Aspects of the present disclosure are directed to methods of forming novel waveguide structures for terahertz applications using ceramic material, including, but not limited the use of alumina.

One aspect of the present disclosure is a terahertz (THz) waveguide for guiding signals having a THz frequency in the range from about 0.1 THz to about 10 THz, comprising: a ceramic core having a cross-sectional dimension of about 500 μm or less, the ceramic core comprising an alumina ribbon having a dielectric constant ($Dk_1$); and a cladding disposed around the ceramic core, the cladding having a dielectric constant ($Dk_2$) such that $Dk_2<Dk_1$. In one aspect, the ceramic core has a cross sectional dimension of about 450 µm or less, alternatively about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 90 µm or less, alternatively about 80 µm or less, alternatively about 70 µm or less, alternatively about 60 µm or less, alternatively about 50 µm or less, alternatively about 40 µm or less, alternatively about 30 µm or less, alternatively about 20 µm or less, alternatively about 10 µm or greater. In a further aspect, ceramic core has a cross dimension of about 20 µm.

In one aspect, the ceramic core has a diameter (D1) of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less. In another aspect, the alumina core is comprised of high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or higher.

In one aspect, the ceramic core has a length of about 100 m or less, alternatively 90 m or less, alternatively 80 m or less, alternatively 70 m or less, alternatively 60 m or less, alternatively 50 m or less, alternatively 40 m or less, alternatively 30 m or less, alternatively 20 m or less, alternatively 10 m or less, alternatively 5 m or less. In a further aspect, the ceramic core has a length of about 10 cm to about 100 m. In one aspect, the ceramic core has a length of at least 10 cm. In one aspect, the ceramic core has a length of at least 1 cm.

In one aspect, the ceramic core has a grain size of about 2 µm or less, alternatively about 1 µm or less, alternatively about 0.5 µm or less. In another aspect, the ceramic core has a bending radius of 17 mm or less, alternatively about 15 mm or less, alternatively about 13 mm or less, alternatively about 11 mm or less, alternatively about 9 mm or less, alternatively about 7 mm or less, alternatively about 5 mm or less, alternatively about 3 mm or less, alternatively about 1 mm or less. In yet another aspect, the ceramic core has a flexural bending strength greater than 700 MPa.

In one aspect, $Dk_1$ is about 4 or greater, alternatively about 6 or greater, alternatively about 10 or greater, alternatively about 15 or greater, alternatively about 20 or greater, alternatively about 30 or greater, alternatively about 37 or greater, alternatively about 100 or greater, alternatively about 200 or greater, alternatively about 300 or greater, alternatively about 400 or greater, alternatively about 500 or greater, alternatively about 600 or greater, alternatively about 700 or greater, alternatively about 800 or greater, alternatively about 900 or greater, alternatively about 1000 or greater. In a further aspect, $Dk_1$ is about 10. In a further aspect, $Dk_1$ is between 5 and 50. In another aspect, the ceramic core has a circular, elliptical or rectangular cross-sectional shape.

In one aspect, the cladding comprises a material selected from the group consisting of polymer, glass, or silicon dioxide. In a further aspect, the polymer is selected from the group consisting of polytetrafluoroethylene (PTFE), SU-8, fluoropolymers, and polystyrene, polyimide (Kapton® (polyimide film) or Cirlex® (polyimide film)), parylene-N, high-density polyethylene (HDPE), polypropylene (PP) and polyethylene cyclic olefin copolymer (Topas® (cyclic olefin copolymer)). In contemplated embodiments, waveguides disclosed herein may include no cladding, and may be "open-air," where the air may serve functions of a cladding.

In one aspect, the cladding has a diameter (D2) of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less. In one aspect, the cladding has a diameter (D2) of about 0.1 mm to about 10 mm.

It is advantageous for the cladding to have a similar loss tangent in the THz range as the core, as well as a low dielectric constant so to minimize transmission loss and the size of the structure formed as part of the waveguide.

In another aspect, the core and the cladding define a dielectric loss $Df<10^{-4}$ or $Df<10^{-3}$ at a frequency of 100 GHz.

Another aspect of the present disclosure is a planar terahertz (THz) waveguide for guiding THz signals having a THz frequency in the range from about 0.1 THz to about 10 THz, comprising: a ceramic core comprising an alumina ribbon having a dielectric constant (Dk1), the ceramic core having opposite first and second planar surfaces and a thickness in the range from 10 µm to 500 µm; and a cladding defined by first and second planar layers respectively disposed immediately adjacent the first and second planar surfaces of the ceramic core, the first and second layers having dielectric constants ($Dk_2$ and $Dk_3$) such that $Dk_2<Dk_1$ and $Dk_3<Dk_1$.

In some aspects, the cladding comprises a material selected from the group consisting of polymer, glass, or silicon dioxide. In a further aspect, the polymer is selected from the group consisting of polytetrafluoroethylene (PTFE), SU-8, fluoropolymers, and polystyrene, polyimide (Kapton® (polyimide film) or Cirlex® (polyimide film)), parylene-N, high-density polyethylene (HDPE), polypropylene (PP) and polyethylene cyclic olefin copolymer (Topas® (cyclic olefin copolymer)). In another aspect, the first and second layers have a thickness in the range from about 0.1 mm to about 10 mm.

In some aspects, the ceramic core has a rectangular cross-sectional shape. In another aspect, the ceramic core and the cladding define a dielectric loss $Df<10^{-4}$ or $Df<10^{-3}$ at a frequency of 100 GHz.

In some aspects, the planar terahertz (THz) waveguide further comprises a substrate having an upper surface and a lower surface, wherein at least one or more terahertz (THz) waveguides are disposed onto the upper surface of the substrate. In a further aspect, the substrate comprises silica glass or a polymer. In yet another aspect, the substrate comprises a dielectric constant ($Dk_5$), such that $Dk_5<Dk_1$. It is advantageous for the first and second planar layers of the cladding to have a similar loss tangent in the THz range as the core, as well as a low dielectric constant so to minimize transmission loss and the size of the structure formed as part of the waveguide.

The alumina ceramic waveguides can be formed using a continuous firing process. In one aspect, the process enables access to a wide form factor range. For example, rectangular waveguides, or ribbons, may be fabricated in the 10 µm to 200 µm thick range at widths from sub-millimeters to several meters and lengths from millimeters to several hundred meters. The ribbon ceramic process may also be used to make a variety of low loss dielectric materials with a range of properties useful to achieve desired design criteria for waveguides in the millimeter to sub-millimeter wave range. In another aspect, ribbon ceramics may be provided in roll form to enable roll to roll processing of waveguide structures. In other aspects, materials such as silica (Dk~4), mullite (Dk~6), alumina (Dk~10), magnesium titanate (Dk~15-20), zirconium tin titanate (Dk~37), titania (Dk~100), and barium titanate (Dk>1000) may be provided in ribbon form.

Another aspect of the present disclosure is a method of forming long, thin ribbons of a ceramic material, comprising the steps of: providing a ceramic sheet material comprising alumina having a thickness of about 500 µm or less and a length of about 10 cm or greater, wherein: the ceramic sheet material has a first edge and a second edge, the second edge is substantially parallel to the first edge, and the first and second edges extend along the length of the ceramic sheet material; creating, via a laser, a damage track on the ceramic sheet material to form a first section and a second section, wherein: the damage track extends along the length of the ceramic sheet material, the damage track is about 15 mm or less from the first edge in a direction toward the second edge of the ceramic sheet material, and a first width of the first section is defined by the first edge and the damage track, and a second width of the second section is defined by the damage track and the second edge; and separating the first section from the second section, wherein the separated first section has a thickness of about 500 µm or less, a length of about 10 cm or greater, and the first width is about 15 mm or less.

In one aspect, the step of separating comprises applying mechanical stress along the damage track to cause separation of the first section from the second section. In another aspect, the step of separating comprises applying thermal stress along the damage track to cause separation of the first section from the second section. In a further aspect, the step of applying thermal stress along the damage track comprises tracing a thermal laser along the damage track. In another aspect, the separation of the first section from the second section occurs in the absence of mechanical or thermal stress.

In one aspect, the laser is a short-pulsed laser. In another aspect, the laser is a high-frequency pulse rate laser. In another aspect, the damage track is created via perforation or nano-perforation laser cutting.

In one aspect, the ceramic sheet material has a thickness of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less. In a further aspect, the ceramic sheet material has a thickness of about 10 µm to about 100 µm.

In one aspect, the ceramic sheet material has a length of at least about 100 cm long, alternatively at least about 1 m long, alternatively at least about 5 m long, alternatively at least about 10 m long, alternatively at least about 20 m long, alternatively at least about 40 m long, alternatively at least about 50 m long, alternatively at least about 60 m long, alternatively at least about 70 m long, alternatively at least about 80 m long, alternatively at least about 85 m long, alternatively at least about 90 m long, alternatively at least about 95 m long, alternatively at least about 100 m long. In another aspect, the first section has a length of about at least about 100 cm long, alternatively at least about 1 m long, alternatively at least about 5 m long, alternatively at least about 10 m long, alternatively at least about 20 m long, alternatively at least about 40 m long, alternatively at least about 50 m long, alternatively at least about 60 m long, alternatively at least about 70 m long, alternatively at least about 80 m long, alternatively at least about 85 m long, alternatively at least about 90 m long, alternatively at least about 95 m long, alternatively at least about 100 m long.

In one aspect, the damage track is about 15 mm or less, about 10 mm or less, about 5 mm or less, about 1 mm or less, about 100 µm or less, about 60 µm or less, or about 25 µm or less from the first edge in a direction toward the second edge on the ceramic sheet material. In a further aspect, the damage track is about 1 mm or less from the first edge in a direction toward the second edge of the ceramic sheet material. In an alternative aspect, the first width of the separated first section is about 15 mm or less, about 10 mm or less, about 5 mm or less, about 1 mm or less, about 100 µm or less, about 60 µm or less, or about 25 µm or less. In a further aspect, the first width of the separated first section is about 1 mm or less. In yet a further aspect, the first width of the separated first section is about 60 µm or less.

In one aspect, first section is moved through a coating die. In a further aspect, the coating die coats the first section with a dielectric cladding material that has a dielectric constant lower than the dielectric constant than that of the first section. In an additional aspect, the dielectric cladding material is polymer, glass, or silicon dioxide. In yet a further aspect, the polymer is selected from the group consisting of polytetrafluoroethylene (PTFE), SU-8, fluoropolymers, and polystyrene, polyimide (Kapton® (polyimide film) or Cirlex® (polyimide film)), parylene-N, high-density polyethylene (HDPE), polypropylene (PP) and polyethylene cyclic olefin copolymer (Topas® (cyclic olefin copolymer)).

In one aspect, the method is a continuous method. In an alternative aspect, the method is a roll-to-roll method.

In one aspect, the alumina is high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In a further aspect, the alumina has a purity of about 99.96% or greater.

In one aspect, the alumina has an average grain size of about 5 µm or less, alternatively about 4 µm or less, alternatively about 3 µm or less, alternatively about 2 µm or less, alternatively about 1.5 µm or less, alternatively about 1 µm or less, alternatively about 0.5 µm or less, alternatively about 0.1 µm or less. In another aspect, the separated first section has a form factor of about 20 µm, alternatively about 30 µm, alternatively about 40 µm, alternatively about 50 µm, alternatively about 60 µm, alternatively about 70 µm, alternatively about 80 µm, alternatively about 90 µm, alternatively about 100 µm, alternatively about 110 µm, alternatively about 120 µm, alternatively about 130 µm, alternatively about 140 µm, alternatively about 150 µm. In yet another aspect, separating the first section from the second section comprises applying a break resistance of about 100 MPa or less, alternatively about 80 MPa or less, alternatively about 50 MPa or less, alternatively about 30 MPa or less, alternatively about 20 MPa or less, or alternatively about 10 MPa or less to the damage track.

In one aspect, the damage track comprises a plurality of ablated regions. In another aspect, each ablated region of the plurality of ablated regions has a depth that is less than the thickness of the ceramic sheet material. In yet another aspect, each ablated region of the plurality of ablated regions extends no more than about 10 µm through the thickness of the ceramic sheet material. In one aspect, the damage track includes a surface crack between at least a portion of the plurality of ablated regions. In another aspect, the damage track has a kerf of about 1 µm or less, alternatively about 0.5 µm or less, alternatively about 0.2 µm or less, or alternatively about 0.1 µm or less. In a further aspect, the damage track has a kerf of about zero.

A different aspect of the present invention is a cut ceramic comprising: a body comprising alumina bound by a cut edge, wherein: the body has a thickness of about 500 µm or less, a length of 10 cm or greater, and a width of about 15 mm or less, the cut edge comprises a plurality of ablated regions spaced apart from one another along the cut edge, the plurality of ablated regions comprises ablated regions created by perforation laser cutting, and each ablated region of the plurality of ablated regions has a depth that is less than the thickness of the body.

In another aspect, the body has a thickness of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less. In a further aspect, the body has a thickness of about 10 µm to about 100 µm. In another aspect, the alumina is high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or greater. In another aspect, the alumina has a grain size of about 5 µm or less, alternatively about 4 µm or less, alternatively about 3 µm or less, alternatively about 2 µm or less, alternatively about 1 µm or less, alternatively about 0.5 µm or less, alternatively about 0.1 µm or less. In a further aspect, the alumina has a grain size of about 1 µm or less.

In another aspect, the body has form factor of about 20 µm, alternatively about 30 µm, alternatively about 40 µm, alternatively about 50 µm, alternatively about 60 µm, alternatively about 70 µm, alternatively about 80 µm, alternatively about 90 µm, alternatively about 100 µm, alternatively about 110 µm, alternatively about 120 µm, alternatively about 130 µm, alternatively about 140 µm, alternatively about 150 µm. In yet another aspect, the centers of adjacent ablated regions are spaced apart from one another by about at least 2 µm along the cut edge, alternatively about at least 1 µm along the cut edge, about at least 0.5 µm along the cut edge, about at least 0.1 µm along the cut edge. In another aspect, the cut edge comprises at least about 10,000 of the ablated regions, alternatively at least about 15,000 of the ablated regions, alternatively at least about 20,000 of the ablated regions, alternatively at least about 25,000 of the ablated regions, alternatively at least about 30,000 of the ablated regions, alternatively at least about 40,000 of the ablated regions, alternatively at least about 50,000 of the ablated regions, alternatively at least about 60,000 of the ablated regions, alternatively at least about 70,000 of the ablated regions, alternatively at least about 80,000 of the ablated regions, alternatively at least about 90,000 of the ablated regions, alternatively at least about 100,000 of the ablated regions. In yet another aspect, each ablated region of the plurality ablated regions extends no more than about 10 µm through the thickness of the body, alternatively no more than about 5 µm through the thickness of the body, alternatively no more than about 1 µm through the thickness of the body, alternatively no more than about 0.5 µm through the thickness of the body. In an alternative aspect, the cut edge includes a surface crack between at least a portion of the plurality of ablated regions.

In another aspect, the body has a width of about 15 mm or less, about 10 mm or less, about 5 mm or less, about 1 mm or less, about 100 µm or less, about 60 µm or less, or about 25 µm or less. In a further aspect, the body has a width of about 1 mm or less. In another aspect, the body has a length of about at least about 100 cm long, alternatively at least about 1 m long, alternatively at least about 5 m long, alternatively at least about 10 m long, alternatively at least about 20 m long, alternatively at least about 40 m long, alternatively at least about 50 m long, alternatively at least about 60 m long, alternatively at least about 70 m long, alternatively at least about 80 m long, alternatively at least about 85 m long, alternatively at least about 90 m long, alternatively at least about 95 m long, alternatively at least about 100 m long.

A different aspect of the present invention is a laser scribed ceramic substrate, comprising a ceramic material comprising alumina having a first surface and a second surface, the second surface being opposite the first surface, wherein the first surface and the second surface define a thickness of the ceramic material, and wherein the thickness is less than about 500 µm; and a damage track formed onto the first surface of the ceramic material, the damage track comprising a plurality of ablated regions in which each ablated region is spaced from about 2 µm to about 50 µm apart from an adjacent ablated region, wherein the damage track defines at least a first section of the ceramic material and a second section of the ceramic material. In another aspect, the ceramic material has a thickness of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less. In a further aspect, the ceramic material has a thickness of about 10 µm to about 100 µm. In another aspect, the alumina is high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or greater. In another aspect, the ceramic comprises alumina with a grain size of about 5 µm or less, alternatively about 4 µm or less, alternatively about 3 µm or less, alternatively about 2 µm or less, alternatively about 1 µm or less, alternatively about 0.5 µm or less, alternatively about 0.1 µm or less. In another aspect, a break resistance of the damage track for separating the first section of the ceramic material from the second section of the ceramic material is about 100 MPa or less, alternatively about 80 MPa or less, alternatively about 50 MPa or less, alternatively about 30 MPa or less, alternatively about 20 MPa or less, or alternatively about 10 MPa or less. In yet another aspect, the ablated regions have a depth that is less than the thickness of the ceramic material. In another aspect, the ablated regions extend no more than about 10 µm through the thickness of the ceramic material. In yet another aspect, the damage track includes a surface crack between at least a portion of the ablated regions.

A different aspect of the present invention is a ceramic ribbon prepared by a method comprising the steps of: providing a ceramic sheet material alumina having a thickness of about 500 µm or less and a length of about 10 cm or greater, wherein: the ceramic sheet material has a first edge and a second edge, the second edge is substantially parallel to the first edge, and the first and second edges extend along the length of the ceramic sheet material; creating, via a laser, a damage track on the ceramic sheet material to form a first section and a second section, wherein: the damage track extends along the length of the ceramic sheet material, the damage track is about 15 mm or less from the first edge in a direction toward the second edge of the ceramic sheet material, and a first width of the first section is defined by the first edge and the damage track, and a second width of the second section is defined by the damage track and the second edge; and separating the first section from the second section, wherein the separated first section comprises the ceramic ribbon, and wherein the ceramic ribbon has a thickness of about 500 µm or less, a length of about 10 cm or greater, and the first width is about 15 mm or less.

In another aspect, the step of separating comprises applying mechanical stress along the damage track to cause separation of the first section from the second section. In yet a further aspect, the step of separating comprises applying thermal stress along the damage track to cause separation of the first section from the second section. In another aspect, the step of applying thermal stress along the damage track comprises tracing a thermal laser along the damage track. In yet another aspect, the ceramic sheet material has a thickness of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less. In a further aspect, the ceramic sheet material has a thickness of about 10 µm to about 100 µm. In another aspect, the damage track is about 1 mm or less from the first edge in a direction toward the second edge on the ceramic sheet material. In a further aspect, the first width of the ceramic ribbon is about 1 mm or less. In another aspect, the damage track is about 60 µm or less from the first edge in a direction toward the second edge on the ceramic sheet material. In a further aspect, the ceramic ribbon is about 60 µm or less.

In another aspect, the method is a continuous method or a roll-to-roll method. In yet another aspect, the alumina is high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or greater. In another aspect, the alumina has an average grain size of about 5 µm or less, alternatively about 4 µm or less, alternatively about 3 µm or less, alternatively about 2 µm or less, alternatively about 1 µm or less, alternatively about 0.5 µm or less, alternatively about 0.1 µm or less. In yet another aspect, the ceramic ribbon has a form factor of about 20 µm, preferably about 30 µm, preferably about 40 µm, preferably about 50 µm, preferably about 60 µm, preferably about 70 µm, preferably about 80 µm, preferably about 90 µm, preferably about 100 µm, preferably about 110 µm, preferably about 120 µm, preferably about 130 µm, preferably about 140 µm, preferably about 150 µm.

In another aspect, separating the first section from the second section comprises applying a break resistance of about 100 MPa or less, alternatively about 80 MPa or less, alternatively about 50 MPa or less, alternatively about 30 MPa or less, alternatively about 20 MPa or less, or alternatively about 10 MPa or less to the damage track. In another aspect, the damage track comprises a plurality of ablated regions. In yet a further aspect, each ablated region of the plurality of ablated regions has a depth that is less than the thickness of the ceramic sheet material. In another aspect, each ablated region of the plurality ablated regions extends no more than about 10 µm through the thickness of the ceramic sheet material. In yet another aspect, the damage track includes a surface crack between at least a portion of the plurality of ablated regions.

In another aspect, a nano-perforated ceramic substrate comprises a ceramic material comprising alumina having a first surface and a second surface and a length of about 10 cm or greater, the second surface being opposite the first surface, wherein the first surface and the second surface define a thickness of the ceramic material and wherein the thickness is less than 500 µm; and a nano-perforation onto the first surface of the ceramic material, the nano-perforation comprising a plurality of ablated regions in which each ablated region is spaced from 2 µm to 50 µm apart from an adjacent ablated region, wherein the nano-perforation defines at least a first section of the ceramic material and a second section of the ceramic material wherein the first section of the ceramic material has a width of 15 mm or less.

In one aspect the nano-perforated ceramic can have a thickness of about 400 µm or less, alternatively about 350 µm or less, alternatively about 300 µm or less, alternatively about 250 µm or less, alternatively about 200 µm or less, alternatively about 150 µm or less, alternatively about 100 µm or less, alternatively about 50 µm or less, alternatively about 25 µm or less, alternatively about 10 µm or less or about 10 µm to about 100 µm.

In yet another aspect, the alumina is high purity alumina. In a further aspect, the alumina has a purity of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or greater. In another aspect, the alumina has an average grain size of about 5 µm or less, alternatively about 4 µm or less, alternatively about 3 µm or less, alternatively about 2 µm or less, alternatively about 1 µm or less, alternatively about 0.5 µm or less, alternatively about 0.1 µm or less.

In another aspect, each ablated region of the plurality ablated regions extends no more than about 10 µm through the thickness of the ceramic, alternatively no more than about 5 µm through the thickness of the ceramic, alternatively no more than about 1 µm through the thickness of the ceramic, alternatively no more than about 0.5 µm through the thickness of the ceramic.

In another aspect, a waveguide configured for guiding electromagnetic signals in a range from about 0.1 THz to about 10 THz is provided. The waveguide includes a core formed from a first material, and the first material is a ceramic having a dielectric constant ($Dk_1$). The core has a cross-sectional dimension of 10 microns to 500 microns, and a length orthogonal to the cross-sectional dimension of at least 3 cm. The waveguide includes a cladding layer formed from a second material, different than the first material, having a dielectric constant ($Dk_2$). The cladding layer is directly coupled to and surrounding an outer peripheral surface of the core, and $Dk_2 < Dk_1$.

In another aspect, a waveguide configured for guiding signals in a range from about 0.1 THz to about 10 THz is provided. The waveguide includes a ceramic core having a cross-sectional area of less than 10 mm², and a length orthogonal to the cross-section of at least 1 cm. The waveguide includes a polymeric cladding coupled to and fully surrounding the core in cross-section.

In another aspect, a waveguide configured for guiding electromagnetic signals in a range from about 0.1 THz to about 10 THz is provided. The waveguide includes a core formed from a first material, and the first material is a polycrystalline ceramic having a dielectric constant ($Dk_1$). The core has a rectangular cross-sectional shape, a cross-sectional area of less than 10 mm² and a length orthogonal to the cross-section of at least 10 cm. The waveguide includes a cladding layer formed from a polymer material having a dielectric constant ($Dk_2$), and the cladding layer is directly coupled to and surrounding an outer peripheral surface of the core. $Dk_2<Dk_1$, and $Dk_1$ is between 5 and 50. The core and the polymeric cladding define a dielectric loss $Df<10^{-3}$ at a frequency of 100 GHz.

These and other advantages and novel features of the present invention, as well as details of illustrated aspects thereof will be more fully understood from the following description and from the figures.

BRIEF DESCRIPTION OF SEVERAL VIEWS OF THE DRAWINGS

FIG. 6A illustrates a 300 nanometer (nm) SiO2 layer by dip coating with TEOS precursor and 500° C. curing. FIG. 6B illustrates a 300 nm SiO2 layer by dip coating with Silsesquioxances 2405 precursor and 200° C. curing.

In FIGS. 15 and 16, a distance of 15.00 μm is shown for scale.

In FIG. 18, a distance of 100 μm is shown for scale.

FIG. 21A shows ceramic ribbons in a hand and FIG. 21B shows ceramic ribbons extending over an edge of a surface.

FIG. 24 shows an unslitted section to hold as a whole piece and a slitting section at a desired length. In FIG. 24 a width is labeled 110 mm and a distance is labeled 5 mm.

FIG. 26 shows a direction of conveyance, counterweighted dancer mechanism, ceramic ribbon, as well as ribbon ceramic green tape (1) before detaching carrier film, with acrylic coating and carrier film, (2) before binder burnout, with acrylic coating, and (3) after binder burnout.

Figure 1A:
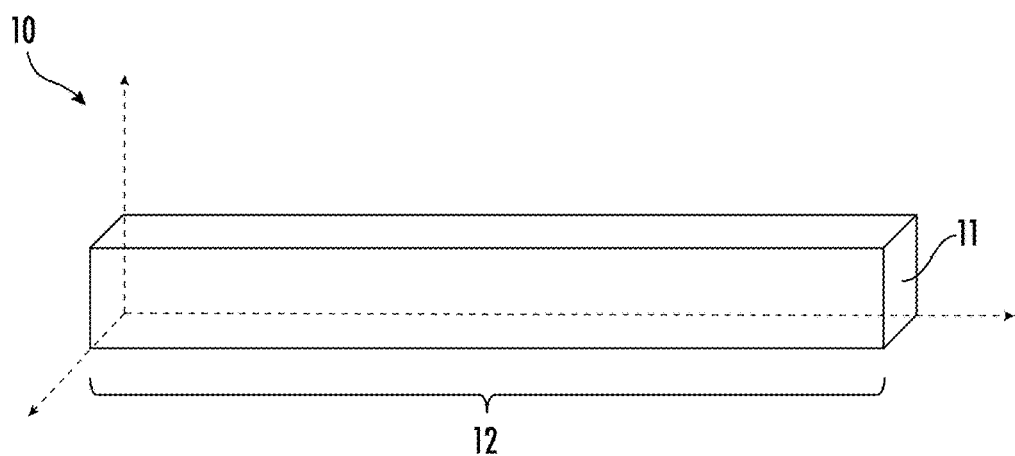
FIG. 1A illustrates a front elevated view of one aspect of a THz waveguide.

The foregoing summary, as well as the following detailed description of certain features of the present application, will be better understood when read in conjunction with the appended drawings. For the purposes of illustration, certain features are shown in the drawings. It should be understood, however, that the claims are not limited to the arrangements shown in the attached drawings.

DETAILED DESCRIPTION OF THE INVENTION

Figure 1B:
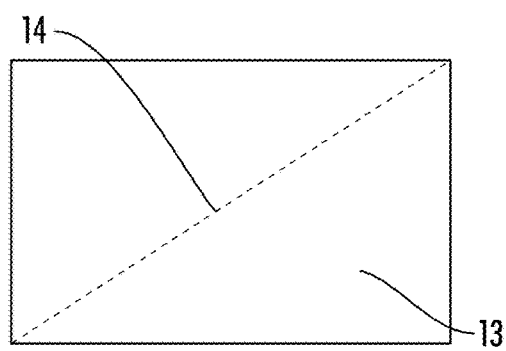
FIG. 1B illustrates a cross-sectional view of one aspect of a THz waveguide having a cross-sectional length.

The present disclosure relates to waveguides configured to transmit electromagnetic waves within the THz range that include a ceramic core and an optional cladding. Multiple aspects of a THz waveguide are shown in FIGS. 1A and 1B. FIG. 1A shows a THz waveguide 10 for guiding signals having a THz frequency in the range of about 0.1 THz to about 10 THz. A THz waveguide 10 transmits signals in the frequency range of about 0.1 THz to about 10 THz by propagating an electromagnetic wave through a core 11 and along a length 12.

Amongst other factors, propagation of an electromagnetic wave is influenced by the size and shape of the waveguide. In some aspects, a ceramic core with smaller cross-sectional dimensions may be more suitable for transmitting waves in the THz range than a core with larger cross-sectional dimensions. FIG. 1B shows an aspect where the ceramic core 13 may have a cross-sectional dimension 14 in the range of about 10 microns to about 500 microns (μm), preferably about 20 μm. The cross sectional dimension (orthogonal to the length and fully spanning the core through a geometric centroid of the core) is not limited to rectangular cross-sectional shapes but may be applied interchangeably to circular, elliptical, or other cross-sectional shapes. Non-circular geometry of the core may provide a bend preference to the waveguide, thereby influencing bend behavior, which may be useful for orientation and alignment of the waveguide into connectors, for example.

Figure 2A:
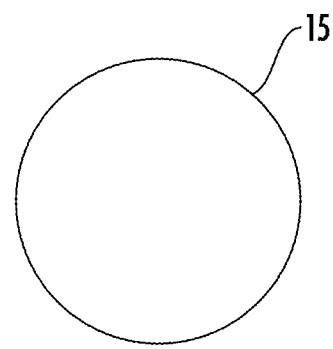
FIG. 2A illustrates a round waveguide cross-section of one aspect of the present invention.
Figure 2B:
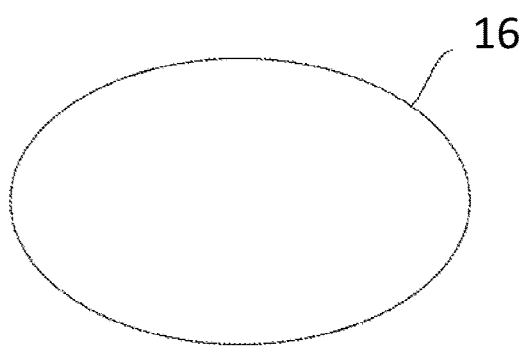
FIG. 2B illustrates an elliptical waveguide cross-section of another aspect of the present invention.

FIG. 1B shows an aspect where the ceramic core 13 may be comprised of any suitable ceramic material and may be rectangular or ribbon-shaped. Electromagnetic waves propagate within the confines of the walls of a waveguide, with the walls acting as boundaries. Therefore, some cross-sectional shapes may be more suitable for transmitting waves in the THz range than other cross-sectional shapes. Cross-sections for different waveguide shapes are shown in FIGS. 2A and 2B. In one aspect, FIG. 2A shows a THz waveguide with a round cross-sectional shape 15. In another aspect, FIG. 2B shows a THz waveguide with an elliptical cross-sectional shape 16. Other waveguide shapes are contemplated that similarly transmit signals in the frequency range of about 0.1 THz to about 10 THz but are influenced by the walls of a variably shaped cross section.

In some aspects, the THz waveguide 10 may have a long form factor. In these aspects, the THz waveguide 10 may have a length 12 of about 3 centimeters (cm) or greater. A longer form factor may be more suitable for transmitting waves in the THz range than a shorter form factor. Similarly, a longer form factor may be more suitable for transmitting waves over a longer distance than a shorter form factor that transmits waves over a shorter distance.

Figure 1C:
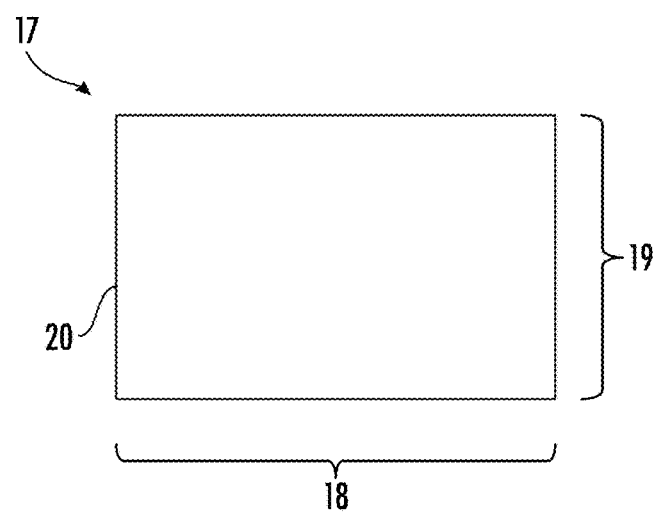
FIG. 1C illustrates a cross-sectional view of a THz waveguide having a core comprised of a length and a width.

In other aspects, the THz waveguide 10 may also be thin. FIG. 1C shows a rectangular cross-section of a THz waveguide 17 having a width 18 and a height 19. In this aspect, the ceramic core 20 may have a width 18 or height 19 in the range of about 20 μm to about 500 μm, preferably about 20 μm. A ceramic core with a smaller width 18 and/or height 19 may be more suitable for transmitting waves in the THz range than a ceramic core with a larger width and/or height. Similarly, a ceramic core with a smaller width 18 and/or height 19 may be more suitable for THz applications requiring smaller waveguides, e.g., inter-chip interconnects or chip-to-chip communication.

Figure 1D:
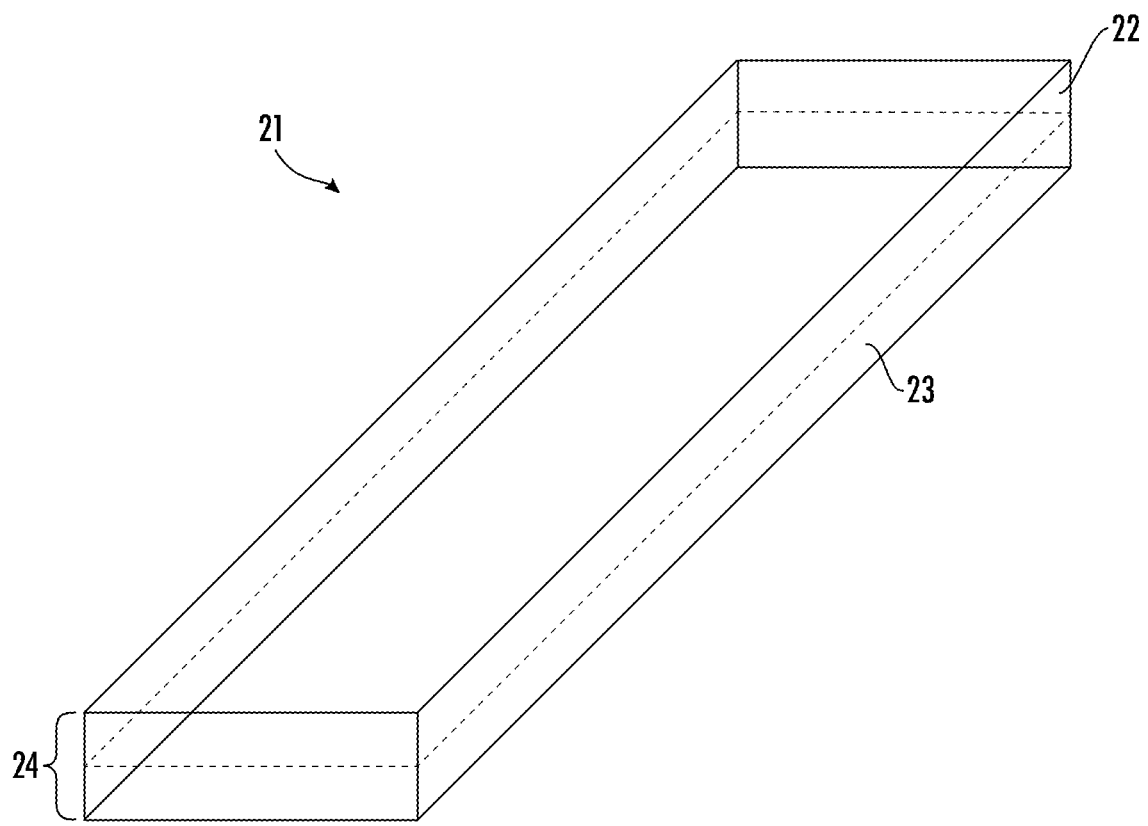
FIG. 1D illustrates a front elevated view of one aspect of a core having opposite first and second planar surfaces

FIG. 1D shows an aspect of a planar THz waveguide for guiding THz signals having a THz frequency in the range from about 0.1 THz to about 10 THz. The planar THz waveguide may be comprised of a ceramic core 21 having first planar surface 22 and opposite second planar surface 23. In this aspect, the ceramic core 21 may be ribbon-shaped and may have a thickness 24 in the range from about 10 μm to about 500 In some aspects, a ceramic core with a smaller thickness may be more suitable for transmitting waves in the THz range than a ceramic core with a larger thickness. Similarly, a ceramic core with a smaller thickness may be more suitable for THz applications requiring smaller waveguides, e.g., inter-chip interconnects or chip-to-chip communication.

Dielectric Properties of a Ceramic Core

In some aspects, the THz waveguides may transmit signals in the frequency range of about 0.1 THz to about 10 THz with a ceramic core comprised of alumina. In other aspects, an alumina core may be comprised of ultra-high purity alumina with a purity level of about 99% or higher, about 99.5% or higher, about 99.75% or higher, about 99.9% or higher, about 99.95% or higher, about 99.96% or higher, or about 99.99% or higher. In yet a further aspect, the alumina has a purity of about 99.96% or higher. In these aspects, an alumina core with a high purity level enables greater dielectric performance than an alumina core with lower purity level. In one aspect, the core may have a Dk in the range of 10-1000 and a dissipation factor ("Df") where $Df<10^{-4}$ or $Df<10^{-3}$, preferably a Dk=10 and a $Df=1\times10^{-4}$, respectively. In view of the present aspects, a waveguide comprised of a high purity alumina core can effectively transmit signals within the THz range while still having low transmission loss.

In other aspects, the alumina ceramic core may have a Dk as recited herein, surrounded by a gas or fluid (e.g., water, air). A high dielectric constant can enable single mode operation in a wide frequency window. Waveguide propagation modes depend on the operating wavelength and polarization, along with the shape and size of the waveguide.

Figure 3:
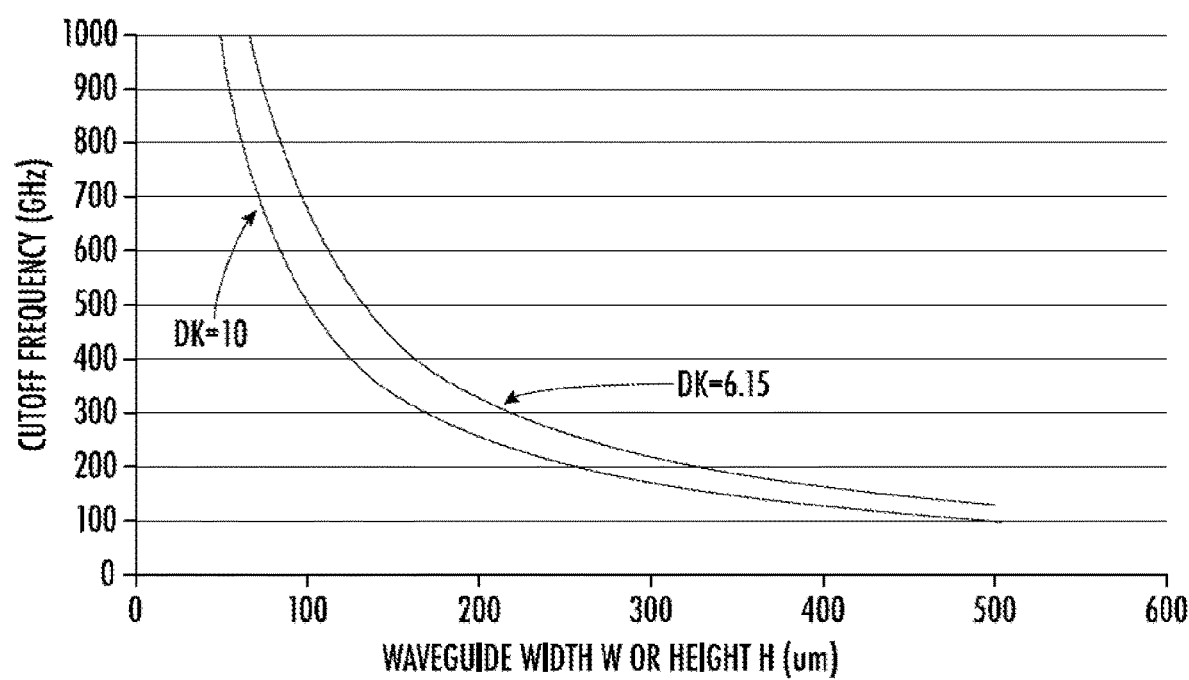
FIG. 3 illustrates a cutoff frequency as a function of waveguide dimension width or height, the cutoff frequency in GHz is plotted as a function of the waveguide dimensions in μm for a w or h of two materials having a Dk=6.15 and a Dk=10.

Depending on the form factor of the waveguide and dielectric properties of the waveguide, a waveguide can permit single mode operation at a high cut-off frequency. Single mode operation can be achieved if the waveguide dimensions width (w) and height (h) satisfy. For material with a high dielectric constant, the waveguide dimensions can be reduced for single mode operation. This can be seen in FIG. 3, where the cutoff frequency is plotted as a function of the waveguide dimensions for a w or h of two materials having a Dk=6.15 and a Dk=10. With a Dk=10, the waveguide dimension can be reduced by 40 μm to 100 μm depending on the cutoff frequency. Small waveguide dimensions increase the waveguide density for waveguide arrays used in interconnects and improve the mechanical flexibility. For a suitably dimensioned alumina ceramic ribbon waveguide having low-loss and a high dielectric constant, the waveguide can exhibit an attenuation coefficient of less than 1 Db/m.

Flexible Ceramic Core

A THz waveguide needs to have both low transmission loss in the THz frequency and a wide range of mechanical properties that allow for operation in a variety of environmental conditions. In one aspect, the ceramic core comprises alumina and may have a grain size of at least about 0.5 μm. A ceramic core that comprises alumina with a smaller grain size can be denser and may exhibit more flexibility than a ceramic core with a larger grain size. In some aspects, ceramic core that comprises alumina with a grain size of less than about 5 μm may have variable flexibility, e.g., a bending radius of about 17 mm for a form factor with a thickness in the range from about 10 μm to about 200 μm. In view of the present aspects, a waveguide comprised of a ceramic core that comprises alumina can effectively transmit signals within the THz range while still having low transmission loss and improved flexibility.

Conventional waveguides that exhibit flexibility may still fracture or shatter when exposed to a variety environmental conditions. Therefore, a THz waveguide that has greater mechanical strength but remains flexible, pliable, or supple, may be more suitable for terahertz applications. As discussed above, a ceramic core that comprises alumina with a smaller grain size can be denser and may exhibit more flexibility, and mechanical strength, than a ceramic core that comprises alumina with a larger grain size. In some aspects, a ceramic core that comprises alumina with a grain size of at least about 0.5 μm may have a mechanical strength of at least 700 MPa when undergoing a 2pt flexural bending strength test. In view of the present aspects, a waveguide comprised of a ceramic core that comprises alumina can effectively transmit signals within the THz range while still having low transmission loss and improved strength.

In other aspects, the ceramic core material is not limited to alumina; core material may also include, for example, silica (Dk~4), mullite (Dk~6), magnesium titanate (Dk~15-20), zirconium tin titanate (Dk~37), titania (Dk~100), or barium titanate (Dk>1000). Other core materials are contemplated that similarly transmit signals in the frequency range of 0.1 THz to 10 THz but provide for a high Dk.

Cladding Configurations

In some aspects, a THz waveguide may have a cladding disposed around a ceramic core that comprises alumina. A cladding serves as a protective material for a ceramic core enabling propagation in the THz range with low transmission loss. In addition, a cladding may inhibit any potential interactions between a propagating wave and the surrounding environment.

Figure 4:
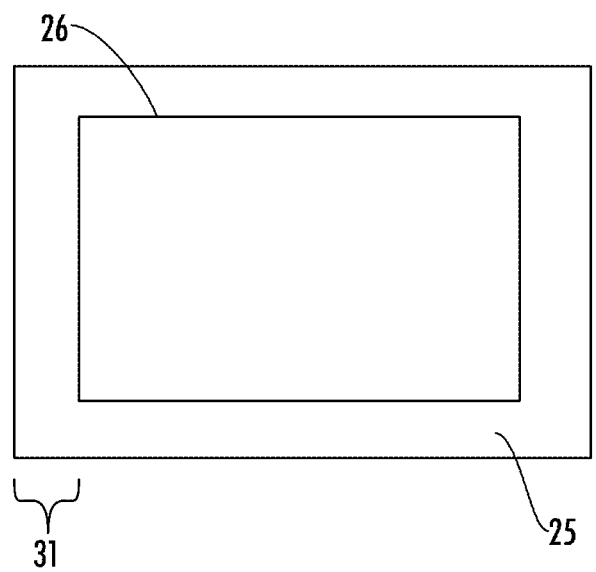
FIG. 4 illustrates a THz waveguide with a cladding disposed around a ceramic core according to one aspect of the present invention.

FIG. 4 shows one aspect where a cladding 25 is disposed around a ceramic 26. In general, in various embodiments, ceramic core 26 is formed from a first material, and cladding 25 is formed from a second material different than the first material and is directly coupled to and surrounding the outer peripheral surface of core 26, as shown in FIG. 4. In some embodiments, ceramic core 26 is formed from a polycrystalline material and specifically a polycrystalline alumina material. In some aspects, it may be preferable for cladding 25 to have a lower dielectric constant than the dielectric constant of core 26. In other aspects, it may be preferable for cladding 25 to have a $Df<10^{-4}$ or $Df<10^{-3}$. As a result, cladding 25 may assist in confining an electromagnetic wave inside the ceramic core structure so that it does not spread out, and losses resulting from this effect are eliminated. It is advantageous for cladding 25 to have a similar loss tangent in the THz range as the ceramic core 26, as well as a low dielectric constant so to minimize transmission loss and the size of the structure formed as part of the waveguide. In some aspects, cladding 25 may have a dielectric constant within the range Dk in the range of 10-1000.

Cladding 25 can be made of glass, silicon dioxide (silica glass), or polymers. In some embodiments, cladding 25 is formed from a polymer material having an inner surface directly coupled to the outer peripheral surface of the core 26 as shown in FIG. 4. In aspects where cladding 25 is made of a polymer, polymers may include, for example, SU-8, polytetrafluoroethylene (Teflon), or other fluoropolymers that have low loss properties in the frequency range of 100 GHz-1000 GHz. Other suitable materials for the cladding 25 may be any combination thereof. As shown in FIG. 4, core 26 is shaped having a first pair of opposing outer surfaces extending lengthwise between opposing first and second ends of the waveguide, and the first pair of outer surfaces are substantially parallel to each other. Specifically, as shown in FIG. 4 and discussed throughout, core 26 may have a rectilinear or rectangular cross-sectional shape or other similar shape. In some embodiments, because core 26 is cut from a sheet of ceramic material, two outer surfaces (e.g., opposing vertical surfaces in FIG. 4) are cut surfaces formed when core 26 is cut from a sheet of material (e.g., sintered ceramic material), and two outer surfaces (e.g., opposing horizontal surfaces in FIG. 4) are uncut sintered surfaces. In some embodiments, the cross-sectional area of core 26 is relatively small, and in specific embodiments is less than 10 mm² and specifically is less than 5 mm².

Figure 5:
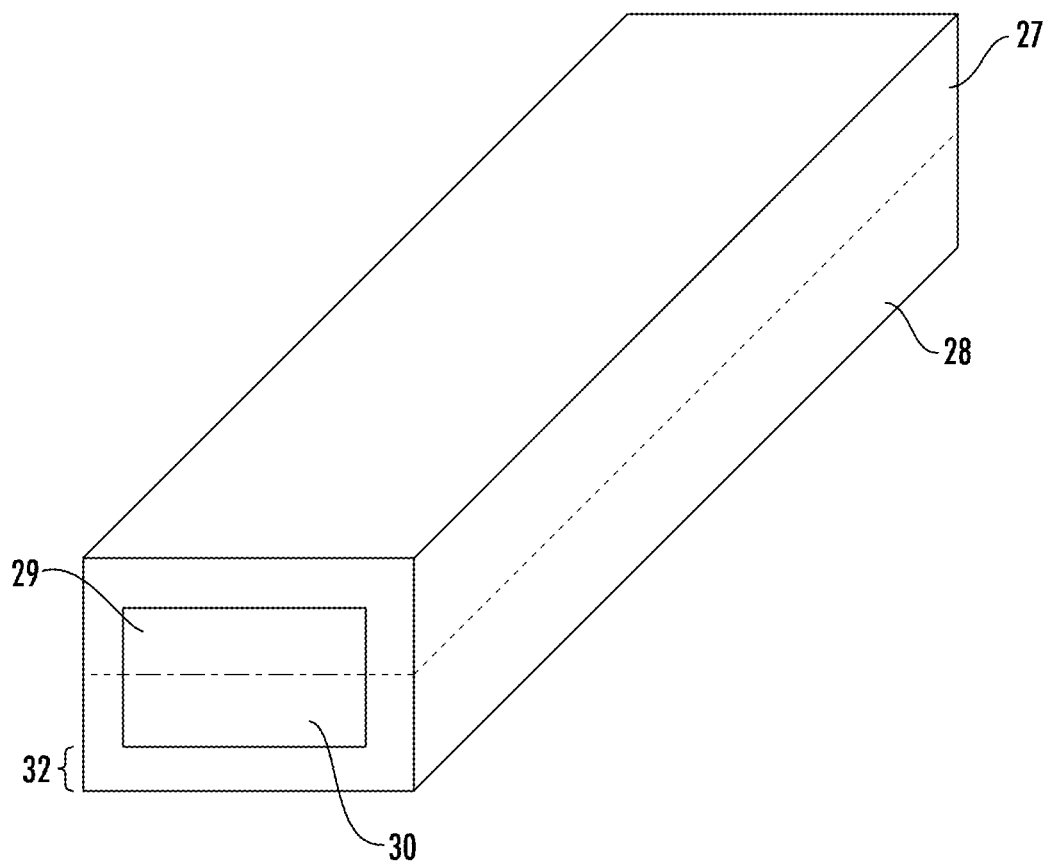
FIG. 5 illustrates a core having opposite first and second planar surfaces according to one aspect of the present invention. According to one aspect, a cladding defined by first and second planar layers may be respectively disposed immediately adjacent to the first and second planar surfaces of the core.

As discussed above, FIG. 1D shows an aspect where a THz waveguide may have a planar configuration. In this aspect, the ceramic core 21 may be comprised of first planar surface 22 and opposite second planar surface 23. FIG. 5 shows one aspect where a cladding is defined by a first planar layer 27 and a second planar layer 28 that may be respectively disposed immediately adjacent to a first planar surface 29 and a second planar surface 30 of the ceramic core.

In some aspects, it may be preferable for the first planar layer 27 of the cladding to have a lower dielectric constant than the dielectric constant of ceramic core. In other aspects, it may be preferable for the second planar layer 28 of the cladding to have a lower dielectric constant than the dielectric constant of the ceramic core. In other aspects, it may be preferable for both the first planar layer 27 and second planar layer 28 of the cladding to have lower dielectric constants than the dielectric constant of the ceramic core. As a result, the first planar layer 27 and second planar layer 28 of the cladding may assist in confining an electromagnetic wave inside the ceramic core structure so that it does not spread out, and losses resulting from this effect are eliminated. It is advantageous for the first and second planar layers of the cladding to have a similar loss tangent in the THz range as the ceramic core, as well as a low Dk so to minimize transmission loss and the size of the structure formed as part of the waveguide.

In yet another aspect, it may be preferable for the first planar layer 27 of the cladding to have a $Df<10^{-4}$ or $Df<10^{-3}$. In other aspects, it may be preferable for the second planar layer 28 of the cladding to have a $Df<10^{-4}$ or $Df<10^{-3}$. In other aspects, it may be preferable for both the first planar layer 27 and second planar layer 28 of the cladding to have a $Df<10^{-4}$ or $Df<10^{-3}$. As a result, the first planar layer 27 and second planar layer 28 of the cladding may assist in confining an electromagnetic wave inside the ceramic core structure so that it does not spread out, and losses resulting from this effect are eliminated. It is advantageous for the first and second planar layers of the cladding to have a similar loss tangent in the THz range as the core, as well as a low DF so to minimize transmission loss and the size of the structure formed as part of the waveguide.

The first and second planar layers of the cladding can be made of glass, silicon dioxide (silica glass), or polymers. In aspects where the first and second planar layers of the cladding are made of a polymer, polymers may include, for example, SU-8, polytetrafluoroethylene (Teflon), or other fluoropolymers that have low loss properties in the frequency range of 100 GHz-1000 GHz. Other suitable materials for the cladding 25 may be any combination thereof.

In aspects where a cladding is disposed around a ceramic core, the waveguide may become stiff, inflexible, or fragile. In addition, disposing a cladding around a ceramic core may increase the overall size of the waveguide. Therefore, the thickness of a cladding may influence the flexibility, durability, and size of a waveguide. In one aspect, the cladding 25 comprises a thickness 31 (FIG. 4) in the range from 0.1 mm to 10 mm. In another aspect, the first planar layer 27 and second planar layer 28 of a cladding comprise a thickness 32 (FIG. 5) in the range of 0.1 mm to 10 mm. Because of the thickness of a cladding, a THz waveguide may remain flexible with the added benefit of reducing the overall size of the waveguide structure.

Figure 6A:
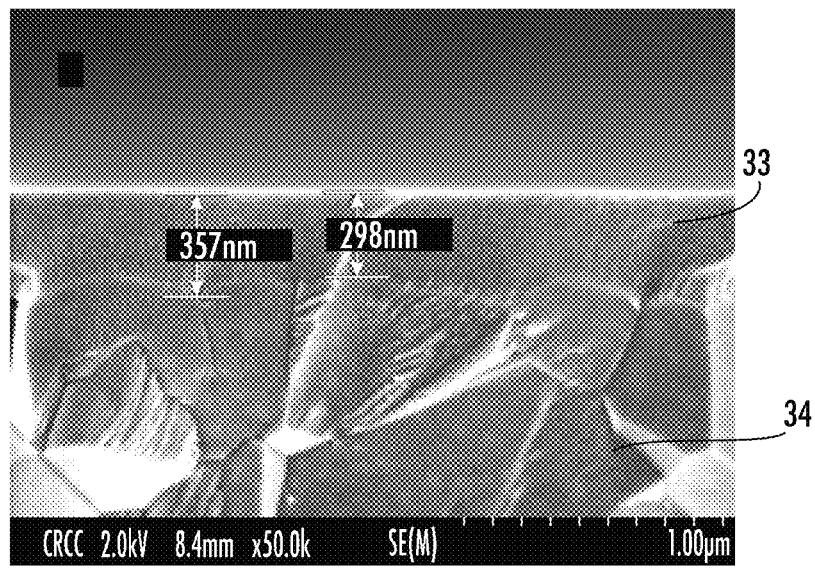
FIGS. 6A and 6B illustrates a dense, crack-free silica layer formed on ribbon alumina by liquid phase deposition or dip coating in accordance with multiple aspects of the present invention. In other aspects of the present invention, coating thickness could be adjusted by changing deposition conditions.
Figure 6B:
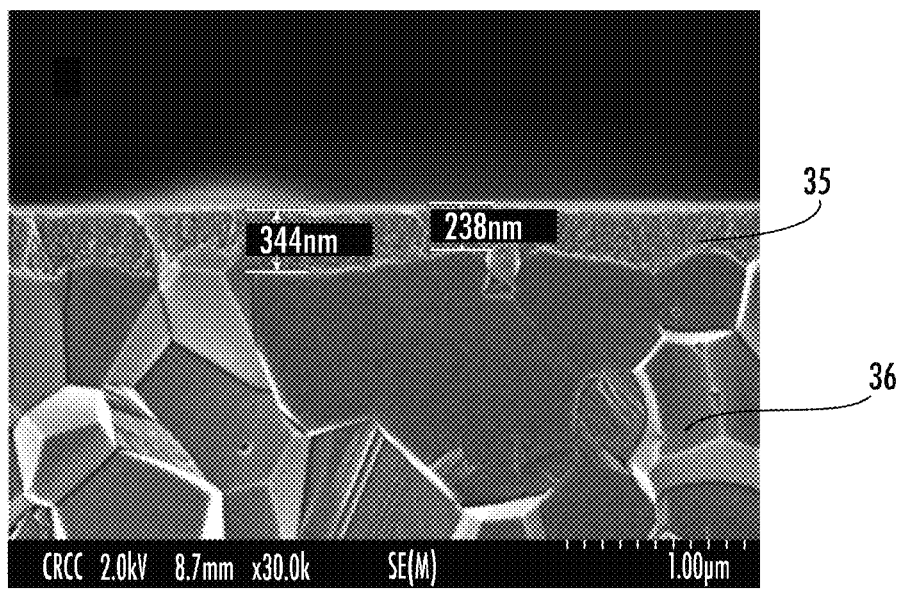

FIGS. 6A and 6B shows cross-sections of claddings with variable thickness. FIG. 6A shows one aspect where a crack-free cladding 33 is respectively disposed immediately adjacent to a ceramic core 34. In this aspect, the cladding 33 can be made of $SiO_2$ (silica glass) and may have a thickness in the range of 298 nm to 357 nm. FIG. 6B shows another aspect where a crack-free cladding 35 is respectively disposed immediately adjacent to a core 36. In this aspect, the cladding 35 can be made of $SiO_2$ (silica glass) and may have a thickness in the range of 238 nm to 344 nm.

Methods of Fabricating THz Waveguides

The alumina ceramic waveguides can be formed using a continuous firing process. In some aspects, nano-perforation technology enables laser micro-machining of a sintered alumina ceramic waveguide into sub-millimeter widths at almost any length, and with pristine edge quality. In these aspects, the process enables access to a wide form factor range. In some aspects, rectangular waveguides, or ribbons, may be fabricated in the 10 μm to 200 μm thick range at widths in the range from sub-millimeters to several meters and lengths in the range from millimeters to several hundred meters. The process may also be used to make a variety of low loss dielectric materials with a range of properties useful to achieve desired design criteria for waveguides in the millimeter to sub-millimeter wave range. In another aspect, ribbon ceramics may be provided in roll form to enable roll to roll processing of waveguide structures. In yet another aspect, materials such as silica (Dk~4), mullite (Dk~6), magnesium titanate (Dk~15-20), zirconium tin titanate (Dk~37), titania (Dk~100), or barium titanate (Dk>1000) may be provided in ribbon form.

Methods of Cladding a Ceramic Core

Other aspects contemplate different methods for cladding a ceramic core comprising alumina. In some aspects, dip coating, spray coating, spin coating, or slot-die coating may be used for cladding a ceramic core comprising alumina with a low-loss polymer, e.g., a polymer with a Dk<3 and a low Df A variety of low-loss polymers may be used for cladding, such as, for example, polytetrafluoroethylene (PTFE), SU-8, fluoropolymers, and polystyrene, polyimide (Kapton® (polyimide film) or Cirlex® (polyimide film)), parylene-N, high-density polyethylene (HDPE), polypropylene (PP) and polyethylene cyclic olefin copolymer (Topas® (cyclic olefin copolymer)).

In other aspects, liquid phase deposition or dip coating may be used for cladding a ceramic core comprising alumina with low-loss silica glass, e.g., silica glass with a Dk~3 and a low Df. Liquid phase deposition may be preferable to clad a very thin and conformal coating layer surrounding the core. In an aspect utilizing dip coating, a SiO2 layer may be deposited by utilizing a Tetraethyl orthosilicate (TEOS) precursor and curing at 500° C. Other aspects deposit a SiO2 layer utilizing a Silsesquioxances 2405 precursor and curing at 200° C. In addition, the deposition conditions may be altered, such that curing occurs at a range of 200° C.-500° C.

Cladding methods are not limited to cladding a ceramic core comprising alumina. In other aspects, the core material may also include, for example, silica (Dk~4), mullite (Dk~6), magnesium titanate (Dk~15-20), zirconium tin titanate (Dk~37), titania (Dk~100), or barium titanate (Dk>1000). Other core materials are contemplated that similarly transmit signals in the frequency range of 0.1 THz to 10 THz but provide for a high Dk.

Substrate Configurations

Figure 7:
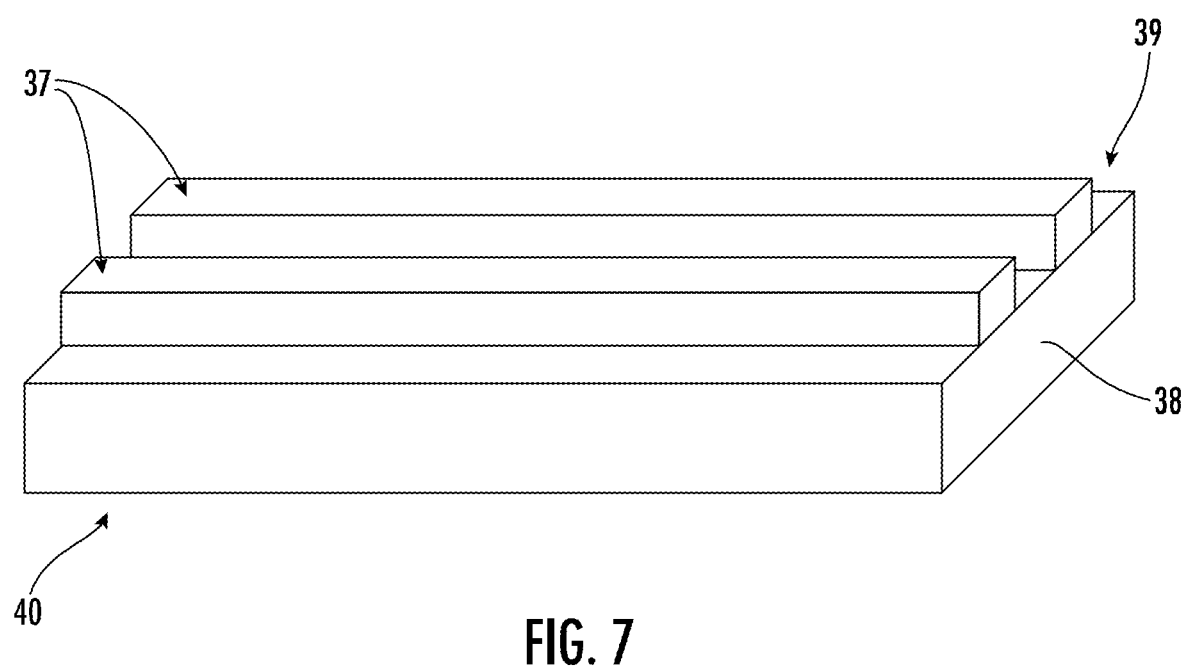
FIG. 7 illustrates more than one THz waveguide on a substrate in accordance with one aspect of the present invention.

In other aspects, a THz waveguide may be integrated with substrate material to make waveguide circuits for interconnect applications, e.g., waveguide arrays, couplers, and splitters. FIG. 7 displays such an aspect where at least one or more THz waveguides 37 may be disposed on a substrate 38 having an upper surface 39 and a lower surface 40. Substrate 38 is preferred to have a lower dielectric constant than the at least one or more THz waveguides 37 so to avoid tunneling loss. In one aspect, multiple waveguides may be disposed on to the upper surface of a substrate. In another aspect, multiple waveguides may be disposed onto a substrate in variable configurations such as in a parallel fashion. In some aspects, the substrate 38 may be comprised of silica glass or a polymer.

Additional THZ Waveguide Designs and Manufacturing Methods

Referring to FIGS. 8, 9, 10A-10E, 11-18, 19A, 19B, 20, 21A, and 21B, ceramic components, such as those used for THz waveguides, and related manufacturing methods are provided according to exemplary embodiments. As discussed above, in some aspects, a waveguide may be configured to transmit electromagnetic waves within the terahertz (THz) band (e.g., frequencies from about 0.1 to about 30 THz) of the electromagnetic spectrum. For brevity, electromagnetic waves within the THz band of the electromagnetic spectrum will hereinafter be referred to as "THz waves." The use of conventional waveguides for the transmission THz waves may have high loss and/or high dispersion rates, and may be bulky, inflexible, or otherwise unfit for the intended use of the waveguide. Moreover, in examples in which conventional waveguides are able to transmit THz waves, such conventional waveguides may only be able to transmit the THz waves over a relatively short distance. Thus, other types of waveguides are needed to effectively transmit THz waves without high loss or dispersion over relatively long distances while being fit for the intended end use of the waveguide. As one example, a waveguide that can effectively transmit THz electromagnetic waves may include a ceramic ribbon and an optional cladding material surrounding the ceramic material.

Figure 8:
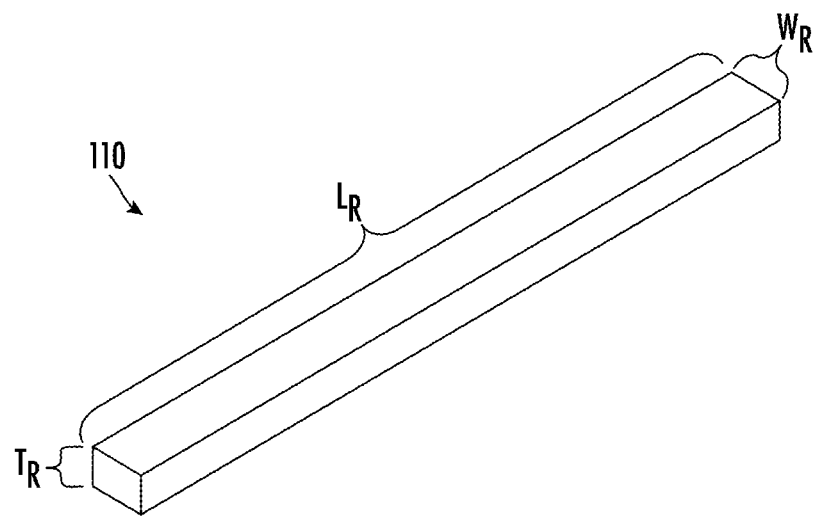
FIG. 8 is a schematic diagram illustrating an example ceramic ribbon.

FIG. 8 is a schematic diagram illustrating one aspect of a ceramic ribbon 110 of the present invention. The ceramic ribbon 110 may include any suitable ceramic material. For example, the ceramic ribbon 110 may include alumina ($Al_2O_3$), zirconia ($ZrO_2$), titania ($TiO_2$), silica ($SiO_2$), or combinations thereof. In examples in which the ceramic ribbon 110 includes alumina, the ceramic ribbon 110 may include high purity alumina. In such examples, the ceramic ribbon 110 may include alumina with a purity of about 99% or higher, about 99.5% or higher, about 99.75% or higher, about 99.9% or higher, about 99.95% or higher, about 99.96% or higher, or about 99.99% or higher. In some examples, the ceramic ribbon 110 includes a material with a relatively high purity, which may exhibit improved dielectric performance in comparison to a ceramic ribbon with a material of lower purity.

In some aspects, the ceramic ribbon 110 may be a relatively long ribbon of ceramic material. In some aspects, the ceramic ribbon 110 may have a length $L_R$ of about 10 centimeters (cm) or greater. In other aspects, length $L_R$ of the ceramic ribbon 110 may be up to about 100 meters (m). The ceramic ribbon 110 may also be relatively thin. In some aspects, the ceramic ribbon 110 may have a thickness $T_R$ of about 500 microns (μm) or less. A thin and long ceramic ribbon 110 may be more effective in transmitting THz waves than a thicker and/or a shorter ceramic ribbon 110. Without being bound by any specific theory, a thinner ceramic ribbon 110 may be better at transmitting higher frequency electromagnetic waves, such as THz waves, than a thicker ceramic ribbon. The ceramic ribbon 110 may have any suitable width $W_R$. In some aspects, the ceramic ribbon 110 may have a width $W_R$ of about 15 millimeters (mm) or less. In other aspects, the ceramic ribbon 110 may have a different width $W_R$. In yet other aspects, the ceramic ribbon 110 may be relatively flexible.

Although the ceramic ribbon 110 is illustrated as having a rectangular cross sectional shape, in other aspects, the ceramic ribbon 110 may have any suitable cross sectional shape for the intended use. For example, in some aspects the ceramic ribbon 110 may have a circular, elliptical, or irregular cross sectional shape. In some aspects, a ceramic ribbon 110 having a square or rectangular cross sectional shape may be better at transmitting THz waves than a ceramic ribbon having a cross sectional shape other than a square or rectangle.

In aspects in which the ceramic ribbon 110 is a relatively long and thin ribbon of ceramic material, the ceramic ribbon 110 may be difficult, expensive, and/or time consuming to manufacture. For instance, conventional methods such as polishing or machining a ceramic material to form a thin, long ceramic ribbon may be unable to produce a ceramic ribbon as thin and/or as long as the ceramic ribbon 110 of the present invention. Such conventional methods may also be time consuming, expensive, and/or wasteful of ceramic material. Moreover, such long, thin ceramic ribbons may be fragile and may be more likely to break or become damaged if manufactured using traditional methods. In addition, conventional methods, such as polishing or machining a ceramic substrate material to form a ceramic ribbon that is long and thin, may result in the ceramic ribbons having a relatively rough surface in comparison to the method described herein. For example, polishing or machining may result in an average surface roughness of greater than about 1 mm. In contrast, the method disclosed herein may form ceramic ribbons having an average surface roughness of less than about 1 mm. In some aspects, the disclosed method may result in ceramic ribbons having an average surface roughness as small as about 15 nm or less.

Figure 9:
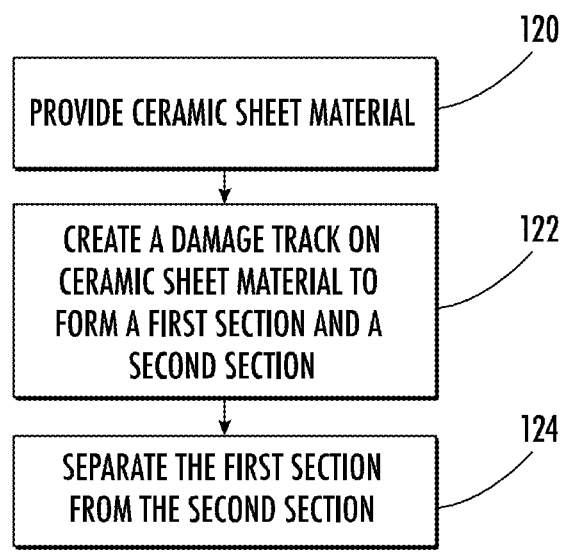
FIG. 9 is a flow diagram illustrating an example method for forming a ceramic ribbon from a ceramic sheet.

FIG. 9 is a flow diagram illustrating an example method for forming ceramic ribbon 110. FIGS. 10A-10E are schematic diagrams illustrating example stages of the method of FIG. 9. FIGS. 10A-10E will be used to describe the method of FIG. 9 for ease of description only; it should be understood that in other aspects, other stages may be used with the method of FIG. 9. Moreover, in other aspects, additional or alternative stages may be used in conjunction with the method of FIG. 9.

Figure 10A:
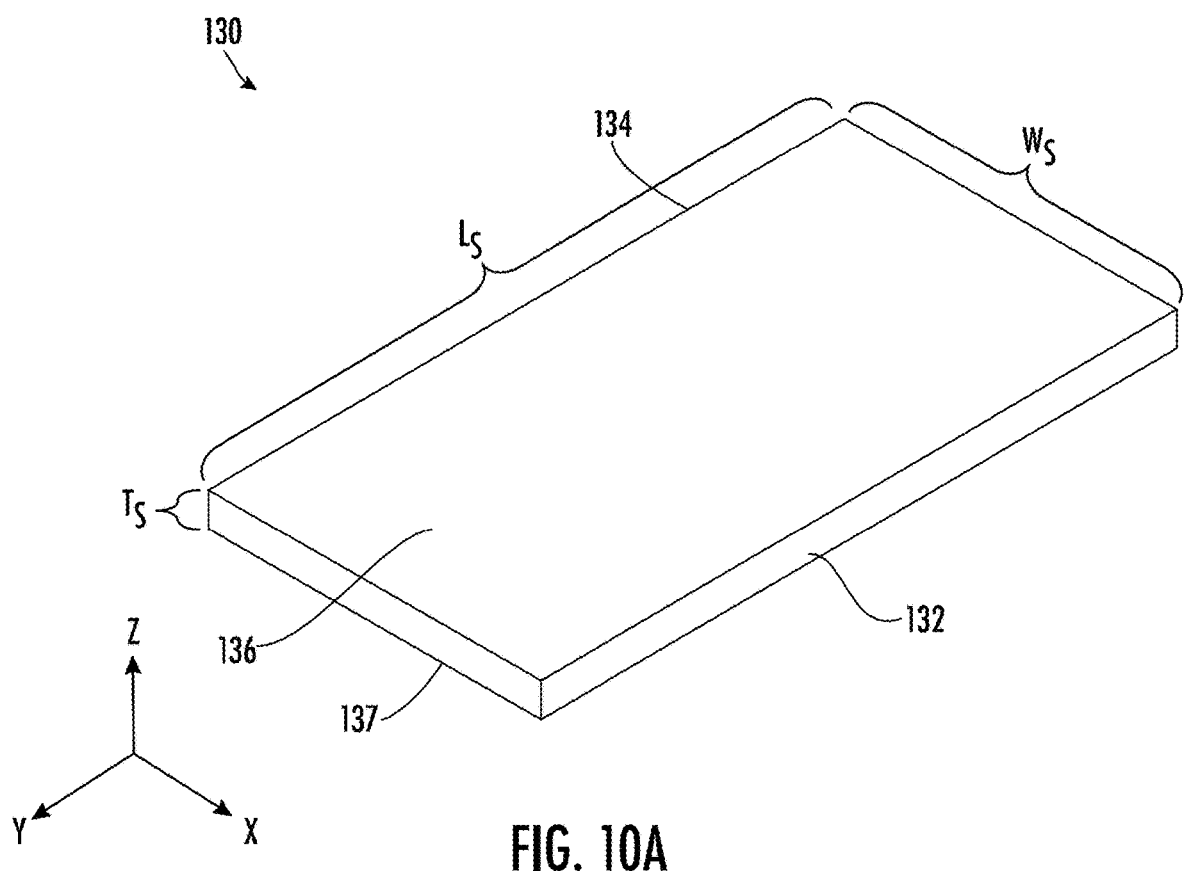
FIGS. 10A-10E are schematic diagrams illustrating example stages of the method of FIG. 9. As may well be intuitive, line 10D in FIG. 10C shows the location and direction of the cross-sectional view of FIG. 10D. Likewise, line 10C in FIG. 10D corresponds to the drawing of FIG. 10C.
Figure 10B:
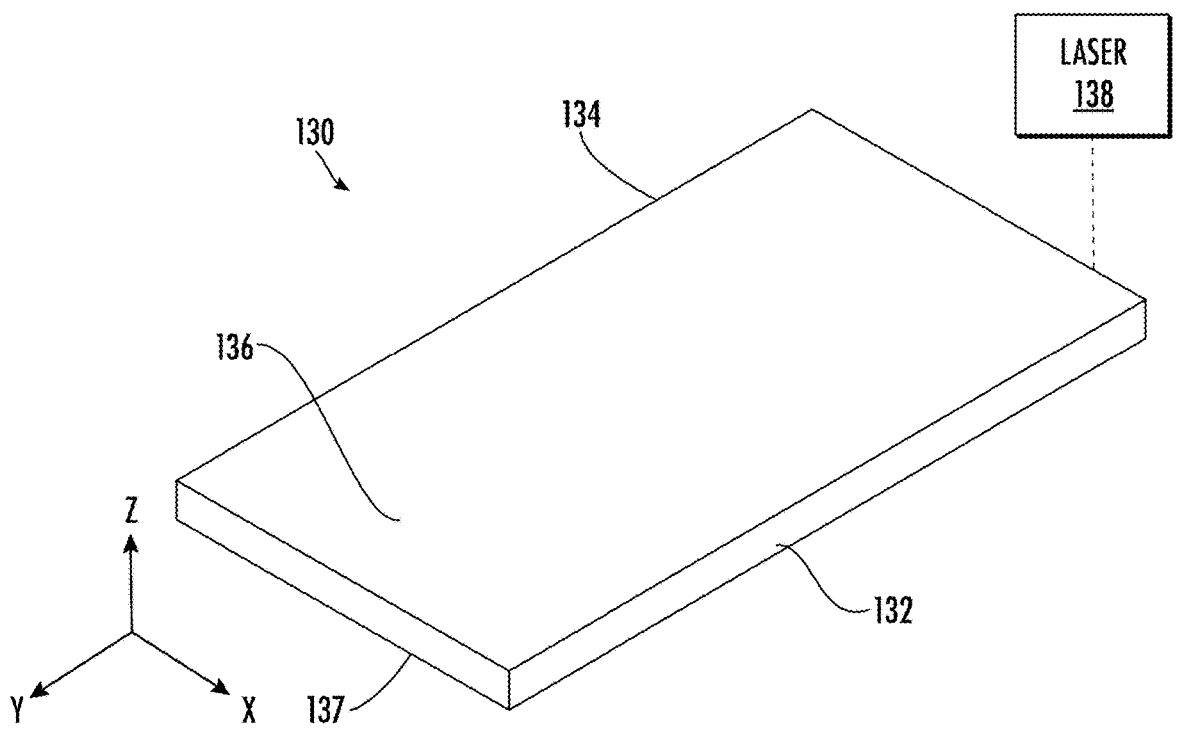
Figure 10C:
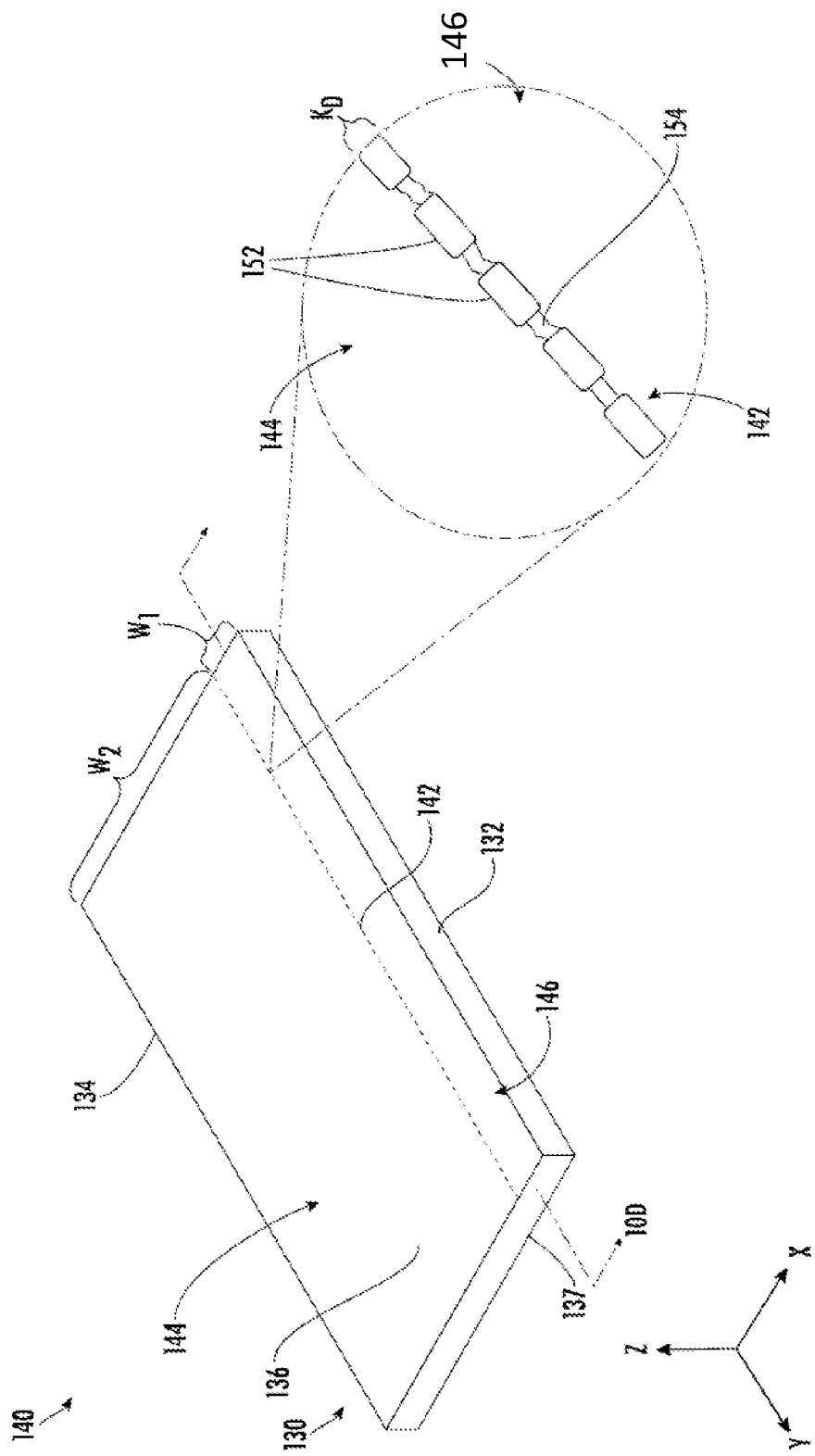

The method of FIG. 9 includes a step 120 of providing a ceramic sheet material 130, as shown in FIG. 10C. Similar to the ceramic ribbon 110 (see FIG. 8), the ceramic sheet material 130 (FIG. 10C) may include any suitable ceramic material. For example, the ceramic sheet material 130 may include alumina, zirconia, titania, silica, or combinations thereof. In aspects in which the ceramic ribbon 110 includes alumina, the ceramic sheet material may include high purity alumina, such as, for example, alumina with a purity of about 99% or higher, about 99.5% or higher, about 99.75% or higher, about 99.9% or higher, about 99.95% or higher, about 99.96% or higher, or about 99.99% or higher. In some such aspects, the ceramic sheet material 130 includes a ceramic material with a relatively high purity, which may exhibit improved dielectric performance in comparison to a ceramic sheet material that includes a ceramic material with a lower purity.

In some aspects, the ceramic sheet material 130 may have an average grain size of about 1 μm or less. In some such aspects, the ceramic sheet material 130 with an average grain size of about 1 μm or less may be denser than a ceramic sheet material with a larger average grain size. In turn, a waveguide including ceramic ribbon 110 formed from ceramic sheet material 130 may exhibit improved properties in comparison to a ceramic ribbon including a less dense material. For instance, the ceramic sheet material 130, and therefore the ceramic ribbon 110 including the ceramic sheet material 130, may exhibit improved mechanical strength in comparison to ceramic sheet materials or ceramic ribbons with greater average grain sizes. As in one aspect, the ceramic ribbon 110 made from the ceramic sheet material 130 having an average grain size of about 1 μm or less may exhibit a mechanical strength of greater than 700 megapascals (MPa) when subjected to a 2 point bending strength test. The design and fabrication of the 2 point bending strength test is straightforward and readily applicable to ceramic sheet material of nearly any size. When bent between two parallel plates, one fixed and the other movable using a stepper motor, the ceramic material deforms to an elliptic shape with variable radius of curvature, thereby experiencing bending stresses with maxima at the mid-length and minima at contact lines with parallel plates In other aspects, the ceramic sheet material 130 may have a different mechanical strength and/or an average grain size greater than about 1 μm.

The ceramic sheet material 130 may be relatively thin (e.g., as measured in the direction of the z-axis illustrated in FIG. 10A). In one aspect, as shown in FIG. 10A, the ceramic sheet material 130 may have a thickness $T_S$ from a first surface 136 to a second surface 137 of about 500 μm or less. In some such aspects, the ceramic sheet material 130 may have a thickness $T_S$ of about 400 μm or less, about 350 μm or less, about 300 μm or less, about 250 μm or less, about 200 μm or less, about 150 μm or less, about 100 μm or less, about 50 μm or less, about 25 μm or less, about 10 μm or less, or less than about 10 µm. In a particular aspect, the ceramic sheet material 130 may have a thickness $T_S$ between about 10 µm and about 100 µm. Providing a ceramic sheet material 130 that is relatively thin may enable the ceramic ribbon 110 to be manufactured from the ceramic sheet material 130 with little or no additional machining, polishing, or the like to create a ceramic ribbon 110 that is thin. In turn, the ceramic ribbon 110 formed from the ceramic sheet material 130 that is thin may be stronger (e.g., have a higher mechanical strength), have a smoother surface, require less processing steps, be less expensive to produce, or the like than a ceramic ribbon formed by a process other than the method of FIG. 9.

In a similar manner, the ceramic sheet material 130 may be relatively long (e.g., as measured in the direction of the y-axis illustrated in FIG. 10A) such that the ceramic ribbon 110 formed from the ceramic sheet material 130 is also long without requiring additional manufacturing steps. In some aspects, as shown in FIG. 10A, the ceramic sheet material 130 may have a length Ls about 10 cm or greater. For example, ceramic sheet material 130 may have a length Ls between about 10 cm and about 100 m, between about 20 cm and about 50 m, between about 50 cm and about 25 m, or between about 1 m and about 10 m. In other aspects, the ceramic sheet material 130 may have a length Ls that is longer than 100 m. In this way, the ceramic ribbon 110 manufactured from the ceramic sheet material 130 may have a relatively long length and losses and complexity associated with the attachment of multiple shorter ceramic ribbons together can be avoided.

The ceramic sheet material 130 may have any suitable width $W_S$ (e.g., as measured in the direction of the x-axis illustrated in FIG. 10A). Width $W_S$ may be measured in the direction of the x-axis from a first edge 132 to a second edge 134 of the ceramic sheet material 130. In some aspects, the second edge 134 is substantially parallel to the first edge 132. The first and second edges 132, 134 may extend along the length Ls of the ceramic sheet material 130. In some examples, the width $W_S$ of the ceramic sheet material 130 may be at least about 10 cm, alternatively about 20 cm, alternatively about 40 cm, alternatively about 50 cm, alternatively about 75, alternatively about 100 cm, or alternatively greater than about 100 cm. In some such aspects, the ceramic sheet material 130 may be used to manufacture multiple ceramic ribbons 110 from the same ceramic sheet material 130, which may reduce material or manufacturing costs and may be more efficient than conventional methods of forming a ceramic ribbon that may require the use of more ceramic sheet materials than the method of FIG. 9. In other aspects the width $W_S$ may be less than about 10 cm.

The method of FIG. 9 further includes a step 122 of creating a damage track 142, as shown in FIG. 10C, on a ceramic sheet material 130 to form a laser scribed ceramic component 140 including a first section 146 and a second section 144, as shown in FIG. 10C. As illustrated in the example of FIG. 10B and FIG. 10C, a laser 138 may be used to create a damage track 142 on a surface 136 of the ceramic sheet material 130. The laser 138 may be any suitable laser configured to form a damage track 142 on the surface 136 of ceramic sheet material 130. For example, the type of laser, laser burst and pulse pattern or frequency, repetition rate, laser beam wavelength, energy level, or other properties of the laser 138 may be tailored to fit specific needs. For instance, properties of the laser 138 may be tailored based on the composition of the ceramic sheet material 130. In one aspect, the laser 138 may be a short pulsed laser (e.g., less than about 20 picosecond (ps) pulses) with a distributed focus. In other aspects, the laser 138 may be a high-frequency pulse-rate laser with an output limited by the heat capacity of the laser medium (e.g., "pulse-burst capability"). In some aspects, the laser 138 generates bursts of 532 nm and/or 1064 nm pulses. In these aspects, the pulses may include 2 pulses/burst or greater, alternatively 4 pulses/burst or greater, alternatively 6 pulses/burst or greater, alternatively 8 pulses/burst or greater, alternatively 10 pulses/burst or greater, alternatively 12 pulses/burst or greater, alternatively 14 pulses/burst or greater, alternatively 16 pulses/burst or greater, alternatively 18 pulses/burst or greater, or alternatively 20 pulses/burst or greater. In these aspects, the pulse energy of each pulse is at least 50 µJ, alternatively at least 100 µJ, alternatively at least 150 µJ, alternatively at least 200 µJ, alternatively at least 250 µJ, alternatively at least 300 µJ, alternatively at least 350 µJ, alternatively at least 400 µJ, alternatively at least 450 µJ, or alternatively at least 500 µJ.

In some aspects, the laser 138 may have parameters configured to create damage track 142 via perforation or nano-perforation laser cutting. Moreover, in some aspects, precision height tracking may be used during the creation of damage track 142 to adjust the delivery of energy by laser 138 to account for any variations in the first surface 136 of the ceramic sheet material 130. For example, variations in the first surface 136 may result in some portions of first surface 136 being closer to laser 138 than other portions of first surface 136, and precision height tracking may be able to adjust the properties of laser 138 such as the centerline of the distributed line focus position so that the laser 138 creates a more uniform damage track 142 on the ceramic sheet material 130.

In some aspect, the nano-perforation allows for the creation of a pristine edge. (See e.g., FIG. 19A). This is in contrast to the amorphous phase built-on edge that is normally associated with an ablative cut. While not being bound by any theory, in some aspects the ablative cut may result in a lot of cutting debris and if the debris is present during the laser cutting then a less dense alumina substrate results. This lower density region near the cut edge results in the absorption of moisture from the air atmosphere. Water has several absorption bands in THz region that degrades propagation performance. As such, a unique and novel property of singulation nano-perforation is the creating of a pristine coating with a clean edge with less probability of accumulating moisture. Additionally, the nano-perforation allows for damage track control, which is extremely important when cutting meter long and sub-mm width dimensions. A randomly oriented damage track may result in undesired or difficult separation as well as the inability to precision control width. This perturbation of width could bring further loss in signal propagation.

Figure 19A:
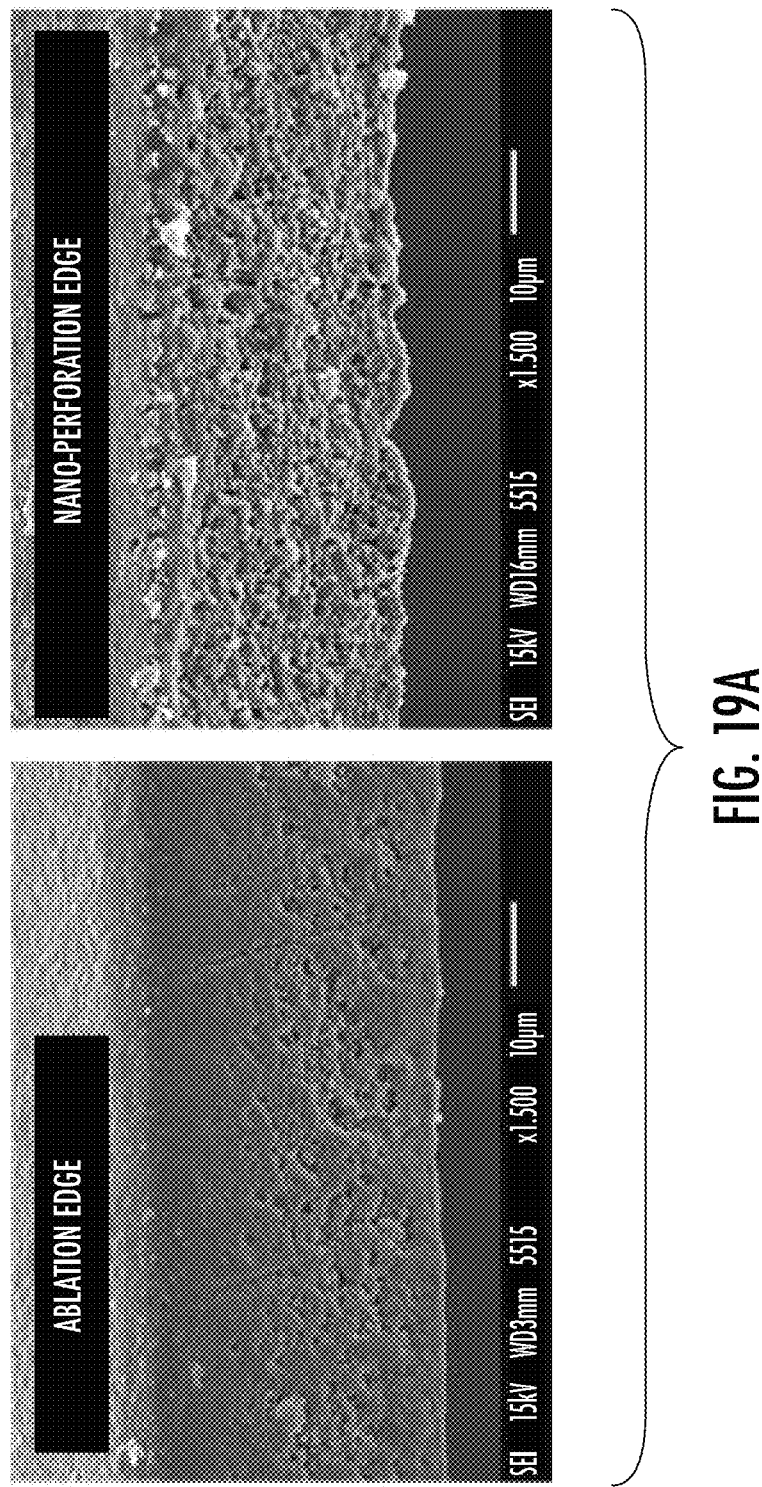
FIG. 19A illustrates the difference between the ablation formed edge and the nano-perforated edge. Parameters SEI 15 kV WD3 mm 5515 x1.500 and distance scale for 10 μm correspond to the microscope settings.
Figure 19B:
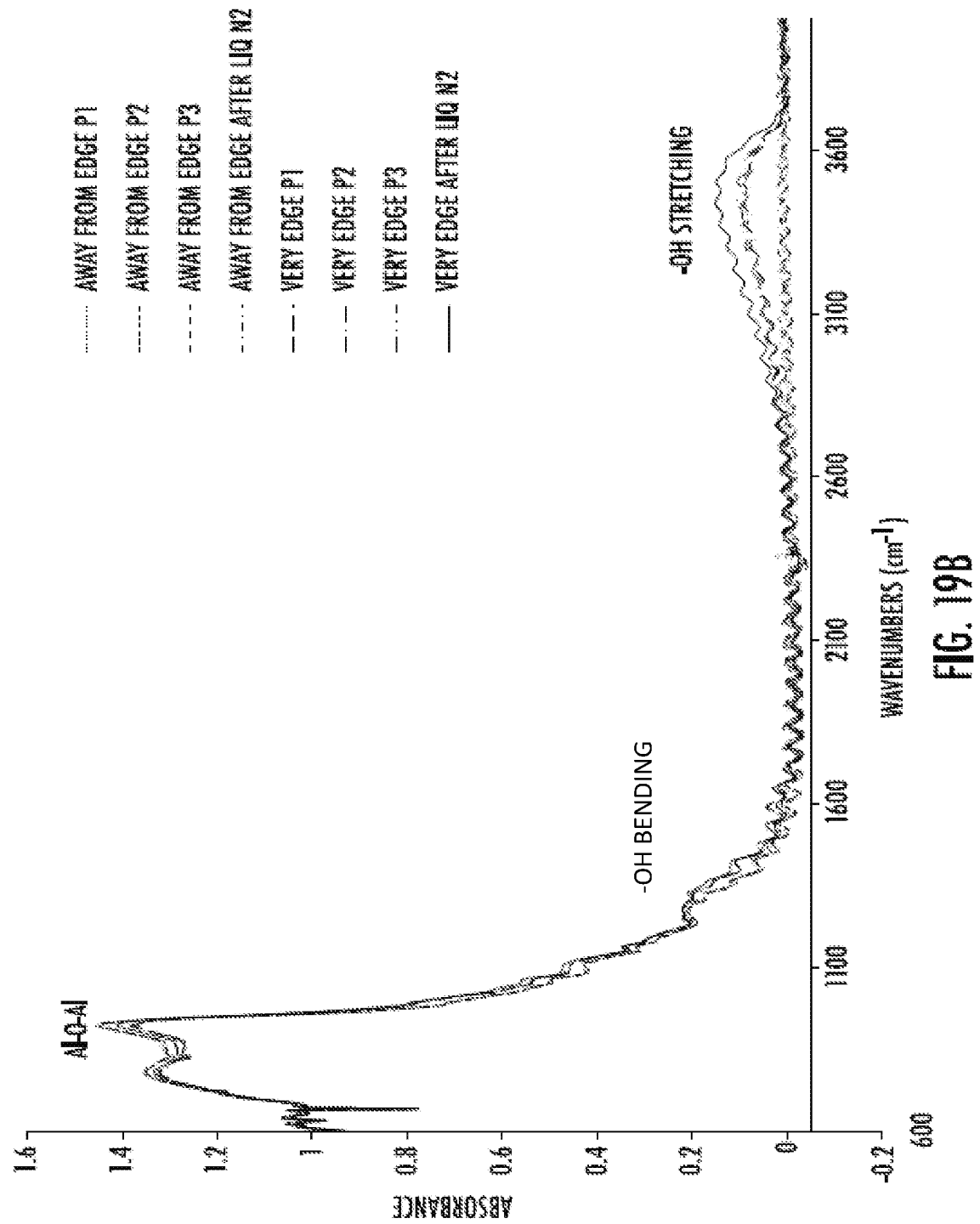
FIG. 19B illustrates Fourier-transform infrared spectroscopy (FTIR) spectrum near the edge of the ablated edge and the nano-perforated edge. FTIR performed on the ablation cut indicates a water signal at the cutting edge. When the measurement is taken away from edge in the ablated edge, the signal disappears. In the case of the nano-perforated edge, the peak disappeared even near the cutting edge. X-axis is in wavenumbers (cm⁻¹) and Y-axis is in absorbance. The curves include "away from edge P1," "away from edge P2," "away from edge P3," "away from edge after LIQ N2," "very edge P1," "very edge P1," "very edge P2," "very edge P3," and "very edge after LIQ N2." Labeled locations on the curves correspond to "Al—O—Al," "—OH Bending," and "—OH Stretching."

As illustrated in FIG. 19B, Fourier-transform infrared spectroscopy (FTIR) performed on the ablation cut indicates a water signal at the cutting edge. When the measurement is taken away from edge by a few tens of microns in the ablated edge, the signal disappears showing that the water absorption is not a bulk effect—rather it is only because of the cutting process. In the case of the nano-perforated edge, the peak disappeared even near the cutting edge indicating that the alumina ribbons cut via nano-perforation do not absorb moisture.

Figure 20:
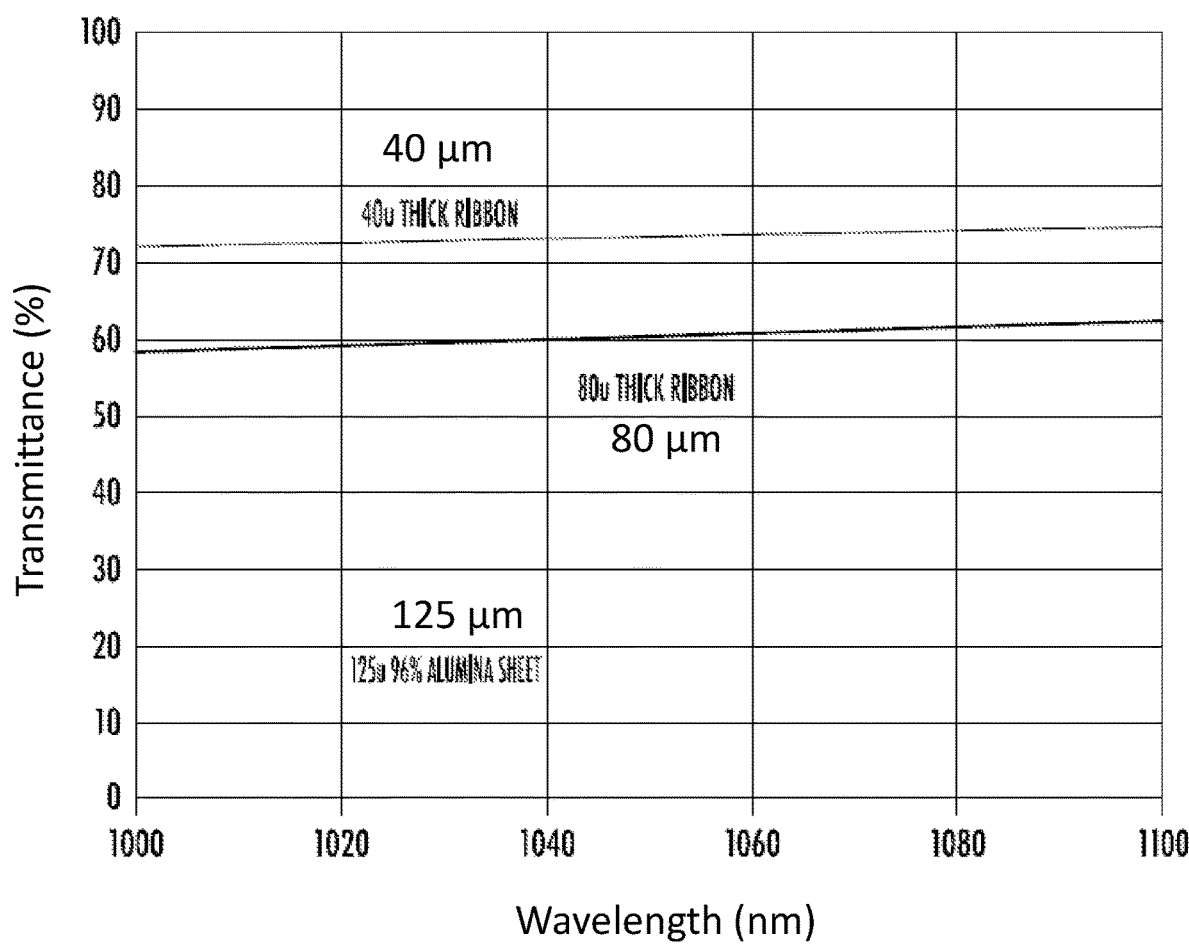
FIG. 20 illustrates in-line transmittance (%) for wavelength (nm) between 40 μm thick ribbon ceramics, 80 μm thick ribbon ceramics and 125 μm thick conventional alumina.
Figure 21A:
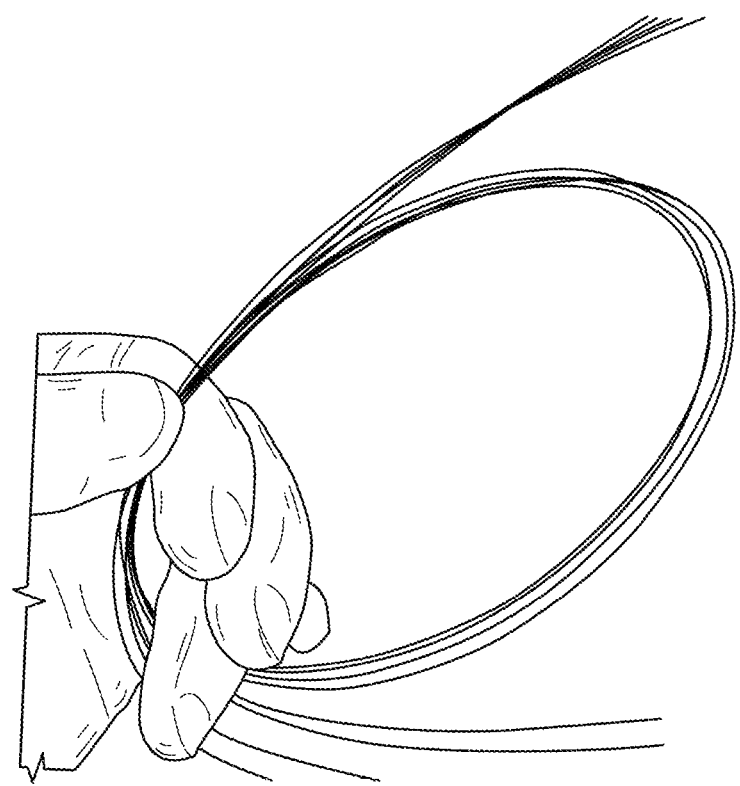
FIGS. 21A and 21B are photographs of ceramic ribbons according to an embodiment of the invention.
Figure 21B:
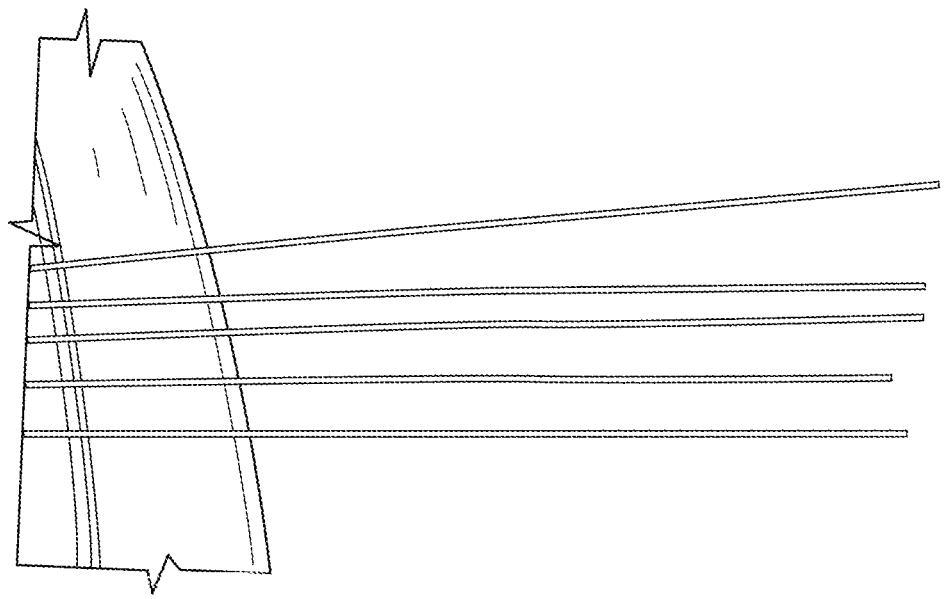

In some aspects, as illustrated in FIG. 20, the low thickness and high transmittance, a result of a fine grain size and dense structure, allows for nano-perforation. 125 µm conventional alumina, for example, cannot be processed with nano-perforation.

In some aspects, the laser 138 may be configured to create a damage track 142 with zero or little kerf $K_D$ (e.g., kerf $K_D$ is width of the damage track 142 as measured in the direction of the x-axis illustrated in FIG. 10C). For example, the damage track 142 may have a kerf $K_D$ of about 1 μm or less, alternatively about 0.5 μm or less, alternatively about 0.2 μm or less, or alternatively about 0.1 μm or less. In some such aspects, a small or even zero kerf $K_D$ of damage track 142 may provide a ceramic ribbon 110 (FIG. 8) formed via the method of FIG. 9 with high quality, or smooth and clean cut, edges without requiring additional processing such as machining or polishing. Moreover, a smaller kerf $K_D$ may enable more ceramic ribbons 110 to be formed from the ceramic sheet material 130.

The laser 138 may be operated in any appropriate manner to create a damage track 142. In some aspects, the ceramic sheet material 130 may be moved relative to the laser 138 (e.g., the laser 138 remains stationary). In other aspects, the laser 138 may be moved relative to the ceramic sheet material 130 (e.g., the ceramic sheet material 130 remains stationary). In yet another aspect, the laser 138 and the ceramic sheet material 130 may be moved relative to each other. In all aspects, the laser 138 is operated to form a damage track 142 that extends along the length Ls (or at least a portion of the length Ls) of the ceramic sheet material 130.

Figure 10D:
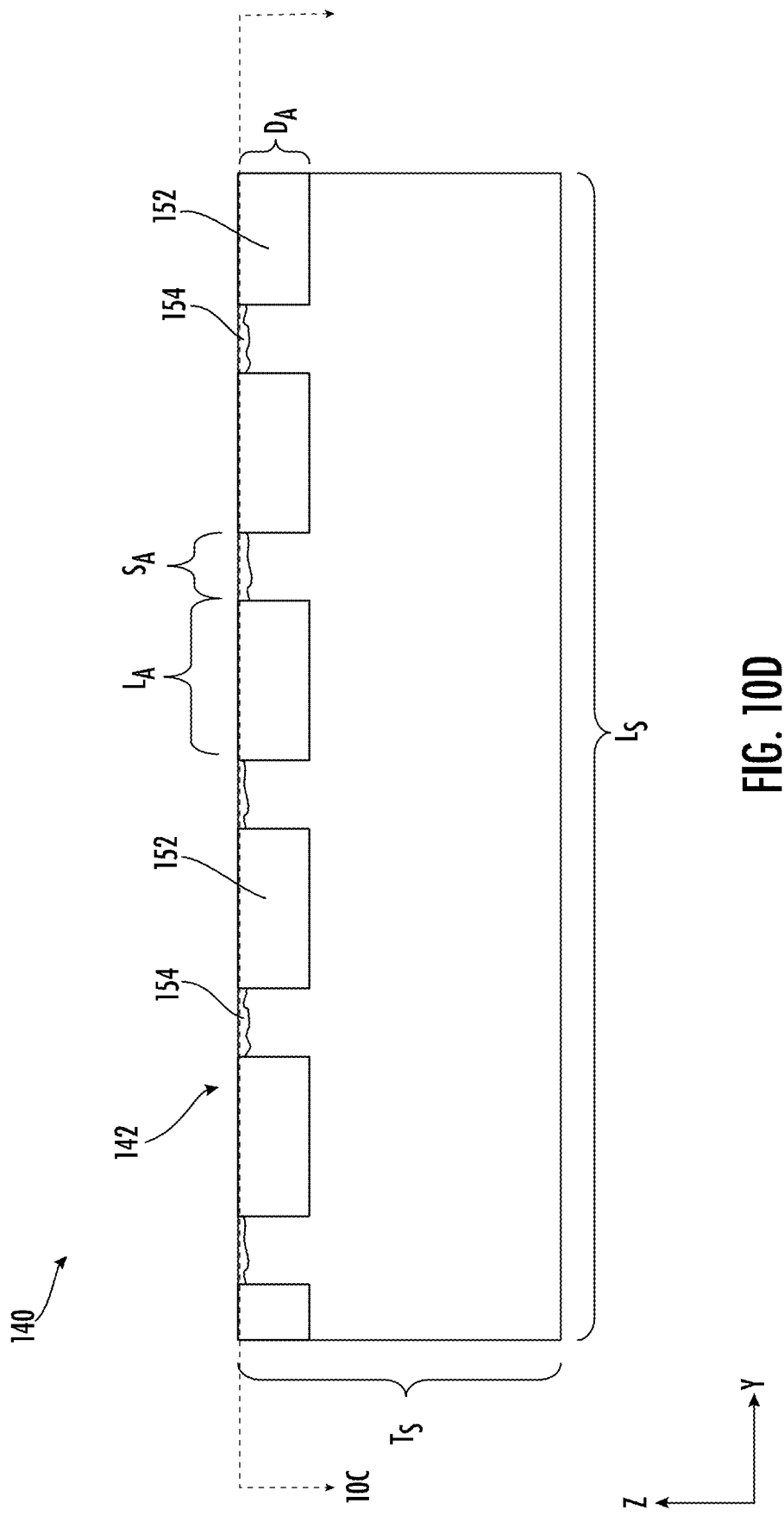

FIGS. 10C and 10D illustrate a laser scribed ceramic component 140 including a ceramic sheet material 130 with a damage track 142 (e.g., as created by laser 138 as shown in FIG. 10B) on the first surface 136 (FIG. 10C). The damage track 142 may include a plurality of localized material features created by the laser 138 (e.g., by perforation laser cutting, nano-perforation laser cutting, or any other method in accordance with the aspects of the disclosure). In one aspect, the damage track 142 may include a plurality of ablated regions 152. In addition, or in the alternative, the damage track 142 may include a surface crack 154 (or a plurality of surface cracks). In some aspects, the damage track 142 may include both a plurality of ablated regions 152 and surface crack 154. In some such aspects, the surface crack 154 may be between at least a portion of the plurality of ablated regions 152. In some aspects, the damage track 142, including both the plurality of ablated regions 152 and surface crack 154, may require less mechanical strength to break laser scribed ceramic component 140 along damage track 142 than some other damage tracks that may not include both the plurality of ablated regions 152 and surface crack 154. For example, damage track 142 may exhibit a break resistance of about 100 MPa or less, about 80 MPa or less, about 50 MPa or less, about 30 MPa or less, about 20 MPa or less, or about 10 MPa or less.

In aspects in which damage track 142 includes a surface crack 154, the surface crack 154 may be formed on the surface 136 of the ceramic sheet material 130. This may be a result of the pulses or bursts of laser 138 used to create the plurality of localized material features (e.g., plurality of ablated regions 152). For example, the stress applied to the surface 136 of the ceramic sheet material 130 during the creation of plurality of ablated regions 152 by laser 138 may cause the ceramic sheet material 130 to crack, such as to form a surface crack 154 between at least a portion of the plurality of ablated regions 152. In turn, in some aspects, a plurality of ablated regions 152 may have first surface roughness that is less than a second surface roughness of surface crack 154.

As seen in the example of FIG. 10D, each ablated region of the plurality of ablated regions may have a depth $D_A$ (e.g., as measured from first surface 136 of ceramic sheet material 130 through thickness $T_S$ in the direction of the z-axis illustrated in FIG. 10D) that is less than the thickness $T_S$ of ceramic sheet material 130. Thus, a laser 138 may create defects in the first surface 136 of the ceramic sheet material 130 to form a damage track 142 without cutting through the entirety of thickness $T_S$ of the ceramic sheet material 130. In some aspects, each ablated region of plurality of ablated regions 152 may extend no more than about 10 μm through the thickness $T_S$ of the ceramic sheet material 130. Expressed in a different way, the depth $D_A$ of each ablated region of the plurality of ablated regions 152 may be about 10 μm or less. In other aspects, the depth $D_A$ of each ablated region of the plurality of ablated regions 152 may extend through a proportion of thickness $T_S$ of the ceramic sheet material 130. For example, depth $D_A$ may be about 100%, alternatively about 90%, alternatively about 80%, alternatively about 70%, alternatively about 60%, or alternatively about 50% of thickness $T_S$. In other aspects, each ablated region of plurality of ablated regions 152 may have a different depth $D_A$. Moreover, although each ablated region of the plurality of ablated regions 152 is illustrated in FIG. 10D as having the same depth $D_A$, in some aspects, one or more ablated regions of a plurality of ablated regions 152 may have a different depth $D_A$ than one or more other ablated regions of a plurality of ablated regions 152.

As illustrated in FIG. 10D, in some aspect, the surface crack 154 may be less deep through thickness $T_S$ of the ceramic sheet material 130 than the plurality of ablated regions 152. In other aspects, the surface crack 154 may be as deep or deeper through thickness $T_S$ of the ceramic sheet material 130 as the plurality of ablated regions 152. In any case, the surface crack 154 may extend through less than the full thickness $T_S$ of the ceramic sheet material 130.

Each ablated region of the plurality of ablated regions 152 may define any suitable length $L_A$ (e.g., as measured in the direction of the y-axis illustrated in FIG. 10D). In some examples, the length $L_A$ of each ablated region of the plurality of ablated regions 152 may be at least about 1 m long, alternatively at least about 5 m long, alternatively at least about 10 m long, alternatively at least about 20 m long, alternatively at least about 30 m long, alternatively at least about 40 m long, alternatively at least about 50 m long, alternatively at least about 60 m long, alternatively at least about 70 m long, alternatively at least about 80 m long, alternatively at least about 85 m long, alternatively at least about 90 m long, alternatively at least about 95 m long, alternatively at least about 100 m long and include any additional increments thereof, for example, about 0.1, about 0.2, about 0.25, about 0.3, about 0.4, about 0.5, about 0.6, about 0.7, about 0.75, about 0.8, about 0.9 or about 1.0 m and multiplied factors thereof, (e.g., about x1, about ×2, about ×2.5, about ×5, about ×10, about ×100, about ×1000, about ×10,000, about ×100,000, etc.).

In other examples, the length $L_A$ of each ablated region of the plurality of ablated regions 152 may be a different length. In some aspects, each ablated region of the plurality of ablated regions 152 may be substantially the same length $L_A$. In other aspects, the one or more ablated regions of the plurality of ablated regions 152 may have a different length $L_A$ than one or more other ablated regions of the plurality of ablated regions 152.

Although plurality of ablated regions 152 are illustrated as having a substantially rectangular shape, plurality of ablated regions 152 may be any shape. For example, in some aspects, the plurality of ablated regions 152 may be elliptical in shape. Moreover, although illustrated as each ablated region of the plurality of ablated regions 152 having substantially the same shape and size, in some aspects, the one or more ablated regions of the plurality of ablated regions 152 may be different in shape and/or size than one or more other ablated regions of the plurality of ablated regions 152.

In some aspects, each ablated region of a plurality of ablated regions 152 may be spaced from an adjacent ablated region of the plurality of ablated regions 152 along a damage track 142 by a separation distance SA. In some such aspects, the separation distance SA may be at least about 2 µm. For example, each ablated region of the plurality of ablated regions 152 may be separated from each adjacent ablated region of the plurality of adjacent regions 152 by a separation distance SA of between about 2 µm and about 50 µm, between about 2 µm and about 40 µm, between about 2 µm and about 30 µm, between about 2 µm and about 20 µm, between about 2 µm and about 15 µm, between about 2 µm and about 12 µm, or between about 2 µm and about 10 µm. In other aspects, each adjacent ablated region of the plurality of adjacent regions 152 has any suitable separation distance SA in accordance with the aspects of this disclosure.

The damage track 142 may include any number of ablated regions of plurality of ablated regions 152. For example, in some cases, the damage track 142 may include a suitable number of ablated regions such that the damage track 142 extends along the entire length Ls (FIG. 10A) of the ceramic sheet material 130 (e.g., based on the length $L_A$ of each ablated region of plurality of ablated regions 152 and the separation distance SA between adjacent ablated regions of the plurality of ablated regions). In some aspects, the damage track 142 may include at least ten ablated regions in the plurality of ablated regions 152.

Although the damage track 142 is described as including a plurality of ablated regions 152 and surface crack 154, the damage track 142 may include any suitable localized material features in accordance with the aspects of the disclosure. In one aspect, the damage track 142 may include a plurality of mechanically cut defects. Thus, the damage track 142 can include any suitable localized material features to facilitate separation of a cut ceramic from the rest of the ceramic sheet material 140.

In some aspects, as discussed above and as illustrated in FIGS. 10C and 10D, the damage track 142 extends along the full length Ls of the ceramic sheet material 130 (e.g., the damage track 142 has substantially the same length as length Ls of ceramic sheet material 130). Creating a damage track 142 along the full length Ls of the ceramic sheet material may make the method of FIG. 9 more efficient and require less processing steps than creating a damage track 142 to only extend along a portion of the length Ls (FIG. 10A). In other aspects, however, the damage track 142 may only extend along a portion of the length Ls of the ceramic sheet material 130.

In examples in which the damage track extends along the full length Ls of the ceramic sheet material 130, the damage track 142 divides the ceramic sheet material 130 into at least a first section 146 and at least a second section 144 as shown in FIG. 10C. In some aspects, the first section 146 may have a first width $W_1$ defined by a first edge 132 and the damage track 142 (e.g., as measured in the direction of the x-axis illustrated in FIG. 10C) and a second section 144 may have a second width $W_2$ defined by the damage track 142 and a second edge 134 (e.g., as measured in the direction of the x-axis illustrated in FIG. 10C). The first width $W_1$ of the first section 146 may correspond to a width $W_R$ of ceramic ribbon 110 formed using the method of FIG. 9. Thus, in some aspects, the first width $W_1$ of the first section 146 may be about 15 mm or less, about 10 mm or less, about 5 mm or less, about 1 mm or less, about 100 µm or less, about 60 µm or less, or about 25 µm or less. Additionally, or alternatively, the damage track 142 may be about 15 mm or less, about 10 mm or less, about 5 mm or less, about 1 mm or less, about 100 µm or less, about 60 µm or less, or about 25 µm or less from the first edge 132 of the ceramic sheet material 130 toward the second edge 134 to define the first section 146 with the same or substantially similar first width $W_1$.

Figure 10E:
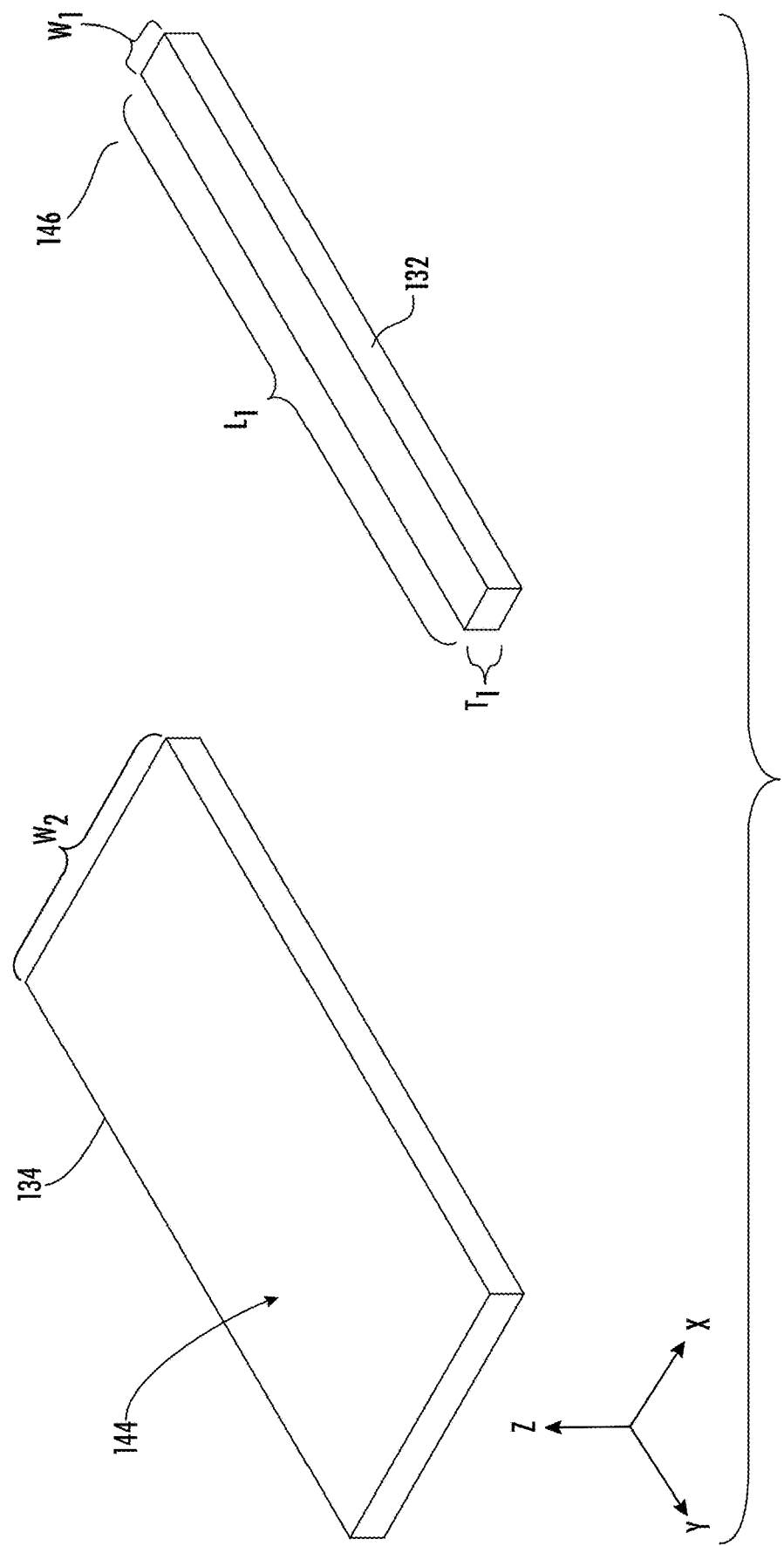

The method of FIG. 9 further includes a step 124 of separating a first section 146 from a second section 144, as shown in FIGS. 10C and 10E. Separating the first section 146 from the second section 144 may form a ceramic ribbon 110 (see also FIG. 8). For example, after separating the first section 146 from the second section 144, the first section 146 may be used as a ceramic ribbon 110. Separating the first section 146 from the second section 144 may include separating the first section 146 from the second section 144 along the damage track 142. In some aspects, separating the first section 146 from the second section 144 along the damage track 142 may be easier than separating a first section from a second section of a ceramic sheet material that does not include a damage track 142. For instance, a damage track 142 created by laser 138 may be relatively weak and therefore facilitate relatively easy, quick, and inexpensive separation of the first section 146 from the second section 144. In one aspect, separating the first section 146 from the second section 144 may include applying a break resistance of about 100 MPa or less, about 80 MPa or less, about 50 MPa or less, about 30 MPa or less, about 20 MPa or less, or about 10 MPa or less to the damage track 142.

Additionally, or alternatively, separating the first section 146 from the second section 144 may include applying mechanical stress along the damage track 142 to cause separation of the first section 146 from the second section 144. For example, a ball roller may be applied along the damage track 142 to cause the damage track 142 to break and cause separation of the first section 146 from the second section 144. In one aspect, force may be applied to one or both of the first section 146 or the second section 144 to bend a ceramic sheet material 130 along the damage track 142 and cause the damage track 142 to break. In yet another aspect, the first section 146 may be unzipped to separate the first section 146 from the second section 144. In such aspects, unzipping the first section 146 may include pulling the first section 146 in a direction away from the second section 144, to cause a break in the damage track 142 and progressively propagate the break along the length of the damage track 142 to separate the first section 146 from the second section 144. In other aspects, applying mechanical stress along the damage track 142 to cause separation of the first section 146 from the second section 144 may include any method of applying mechanical stress. In some aspects, separation of the first section 146 from the second section 144 does not require additional mechanical or thermal stress. As illustrated in FIGS. 10C and 10E, after the nano-perforation step, the damage track 142 propagates and the first section 146 and the second section 144 separate.

In some aspects, separating the first section 146 from the second section 144 may include applying thermal stress along the damage track 142 to cause separation of the first section 146 from the second section 144. In some such aspects, applying thermal stress along the damage track 142 to cause separation of the first section 146 from the second section 144 includes tracing a thermal laser along the damage track 142. In other aspects, applying thermal stress along the damage track 142 to cause separation of the first section 146 from the second section 144 may include any method of applying thermal stress.

In some aspects, separating the first section 146 from the second section 144 may include manually separating the first section 146 from the second section 144. In one aspect, manually separating the first section 146 from the second section 144 may include manually unzipping the first section 146 by pulling the first section 146 in a direction away from the second section 144 to cause the damage track 142 to break. In other aspects, other manual techniques may be used to separate the first section 146 from the second section 144. Moreover, in some aspects, a technique other than manually separating, applying mechanical stress, or applying thermal stress may be used to separate the first section 146 from the second section 144.

After separating the first section 146 from the second section 144, the separated first section 146 may have width $W_1$, length $L_1$, and thickness $T_1$ as shown in FIG. 10E. Width $W_1$ may be the same or substantially the same as described above with respect to the laser scribed ceramic component 140. For example, width $W_1$ may be about 15 mm or less, about 10 mm or less, about 5 mm or less, about 1 mm or less, about 100 μm or less, about 60 μm or less, or about 25 μm or less. Length $L_1$ may be the same or substantially the same as length Ls of the ceramic sheet material 130. Thus, length $L_1$ may be about 10 cm or greater, such as between about 10 cm and about 100 m, between about 20 cm and about 50 m, between about 50 cm and about 25 m, or between about 1 m and about 10 m. Thickness $T_1$ may also be the same or substantially the same as thickness $T_S$ of the ceramic sheet material 130. In some such aspects, thickness $T_1$ of the separated first section 146 may be about 500 μm or less, such as, for example, about 400 μm or less, about 350 μm or less, about 300 μm or less, about 250 μm or less, about 200 μm or less, about 150 μm or less, about 100 μm or less, about 50 μm or less, about 25 μm or less, about 10 μm or less, or less than about 5 μm and variations of about 68.27%, alternatively about 95.45%, and alternatively about 99.73%. In some aspects the thickness $T_1$ is confirmed with a 1 sigma, 3 sigma, or 5 sigma variation. In a particular aspect, thickness $T_1$ is between about 10 μm and about 100 μm. In this aspect, the separated first section 146 may be a relatively long and thin ribbon of ceramic material.

Such dimensions as described herein may result in a separated first section 146 having a form factor of about 20 μm or greater. For example, the first section 146 may have a form factor of about 30 μm, about 40 μm, about 50 μm, about 60 μm, about 70 μm, about 80 μm, about 90 μm, about 100 μm, about 110 μm, about 120 μm, about 130 μm, about 140 μm, or about 150 μm. The first section 146 with such a form factor may enable the first section 146 to be a ceramic ribbon 110, which may be a part of a THz waveguide. Moreover, the first section 146 having the form factor described herein may enable the first section 146 to be compatible with existing cladding or other processes related to manufacturing waveguides.

In some aspects, while still attached to a second section 144, the first section 146 may define a cut ceramic having a body bound by a cut edge (e.g., the damage track 142). Therefore, the cut ceramic may include a body including a ceramic composition such as alumina. In other aspects, the cut ceramic body is not limited to alumina; but may also include, for example, silica (Dk~4), mullite (Dk~6), magnesium titanate (Dk~15-20), zirconium tin titanate (Dk~37), titania (Dk~100), or barium titanate (Dk>1000). Other ceramic materials are contemplated that similarly transmit signals in the frequency range of 0.1 THz to 10 THz but provide for a high Dk.

In some such aspects, the body of the cut ceramic (e.g., the first section 146) may include alumina, such as, for example, high purity alumina (e.g., alumina with a purity of about 99% or higher, about 99.5% or higher, about 99.75% or higher, about 99.9% or higher, about 99.95% or higher, about 99.96% or higher, or about 99.99% or higher). In some aspects, the alumina may have an average grain size of about 1 μm or less. The body of the cut ceramic may likewise have the same dimensions as the first section 146. For example, the body of the cut ceramic may have a first width $W_1$ of about 15 mm or less, a length $L_1$ of about 10 cm or greater, and a thickness $T_1$ of about 500 μm or less. The body of the cut ceramic may have any other dimensions in accordance with this disclosure. Moreover, the dimensions of the body of the cut ceramic may yield a form factor of about 20 μm to about 150 μm.

Figure 11:
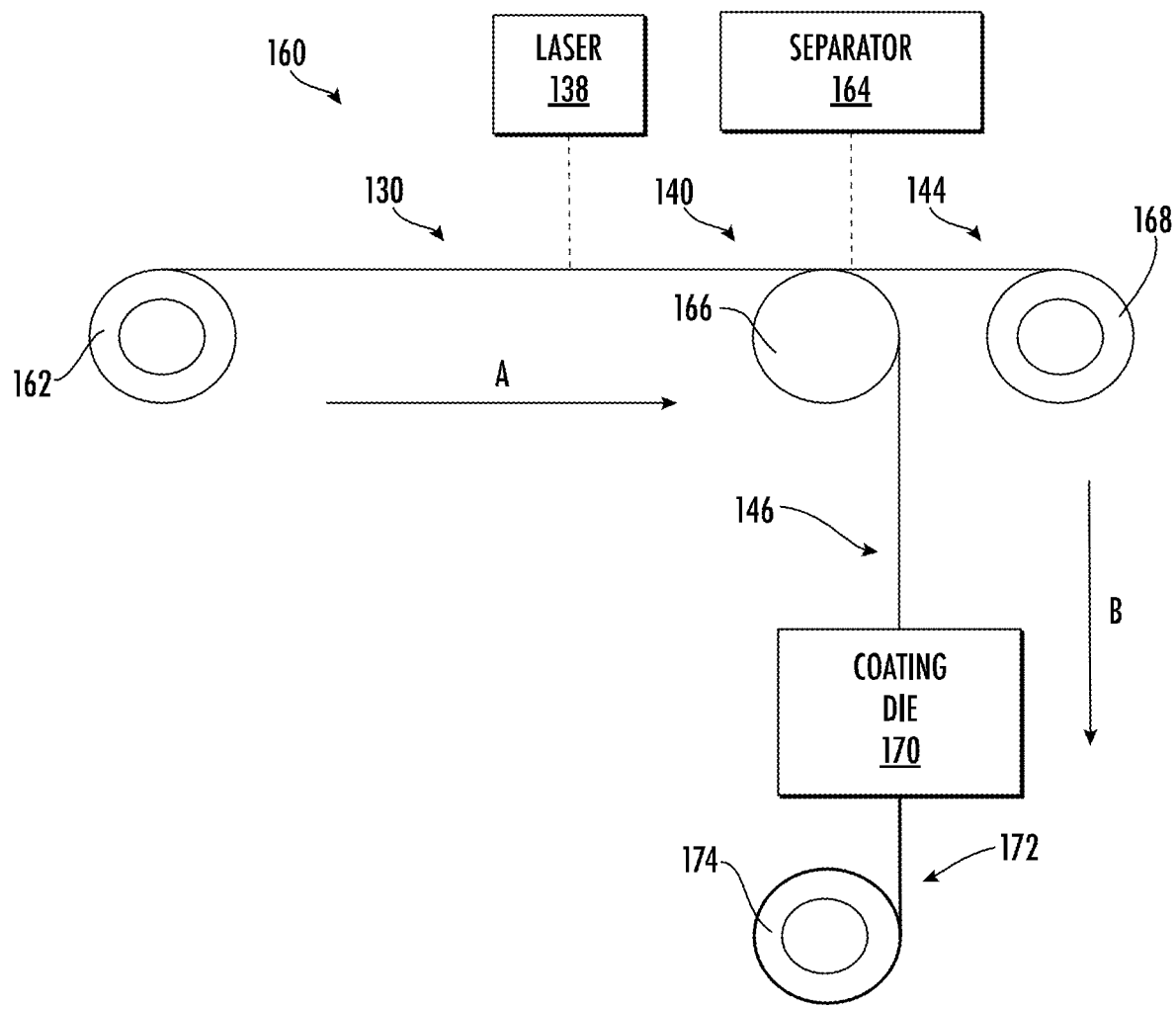
FIG. 11 is a schematic diagram illustrating an example system for forming ceramic ribbons using a continuous method of the method of FIG. 9. A and B are directions.

FIG. 11 is a schematic diagram illustrating an example system 160 for forming ceramic ribbons 110 using a continuous method of the method of FIG. 9. In some aspects, the method of FIG. 9 may be a continuous method. For example, in some aspects, the method of FIG. 9 may be performed in a roll-to-roll process. In aspects in which the method of FIG. 9 is a continuous method, the continuous method may be performed using system 160 configured for continuous or roll-to-roll operation. In other aspects, a continuous version of the method of FIG. 9 may be performed using a different system than the system 160 illustrated in FIG. 11.

Using the system 160, a ceramic sheet material 130 may be provided via a roll 162 of a ceramic sheet material 130. The system 160 may be configured to continuously move the ceramic sheet material 130 such that laser 138 continuously creates a damage track on the surface of the ceramic sheet material 130. Thus, after the ceramic sheet material 130 passes through or under the laser 138, the system 160 may move the laser scribed ceramic component 140 through or under a separator 164. The separator 164 may include any suitable component configured to separate the first section 146 of laser scribed component 140 from the second section 144 of laser scribed component 140. For example, the separator 164 may include a ball roller 166 and/or a thermal laser. In other aspects, the separator 164 may include any other suitable separator. After the separator 164, second section 144 may be rolled onto a roller 168, while the first section 146 may be moved for additional processing. For example, the first section 146 may be moved through a coating die 170 to be coated with a cladding material. In some aspects, the cladding material is non-removable. The coated first section 172 may then be rolled on a roller 174. In some aspects, the coated first section 172 may be used as a waveguide or be included in a waveguide. In other aspects, the first section 146 may not undergo further processing. In some aspects, the second section 144 may also undergo further processing. For example, the second section 144 may have another damage track created by a laser and separated to form additional ceramic ribbons from the ceramic sheet material 130 (or the second section 144). In another aspect, the second section 144 may be routed back to the roll 162 and re-fed into the system 160 for further laser and separating processing. Such a continuous system like system 160 may enable efficient, inexpensive, and delicate manufacturing of ceramic ribbons, such as for use in THz waveguides.

Figure 12:
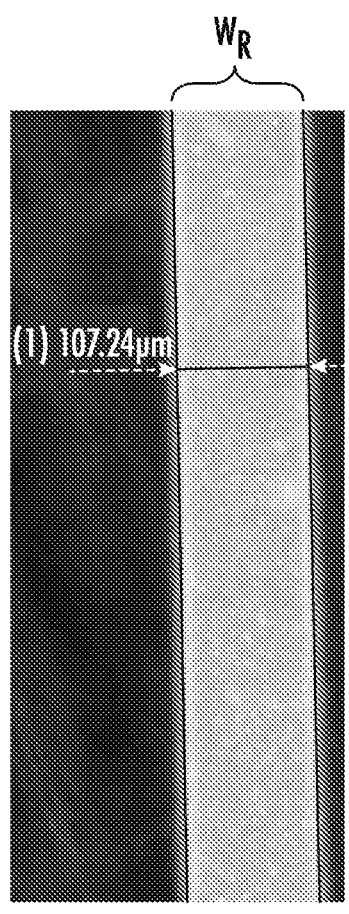
FIGS. 12-17 are photographs illustrating long, thin ribbons of ceramic material made in accordance with the aspects of the disclosure.
Figure 13:
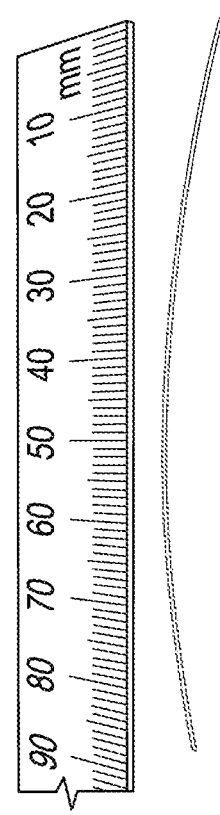
Figure 14:
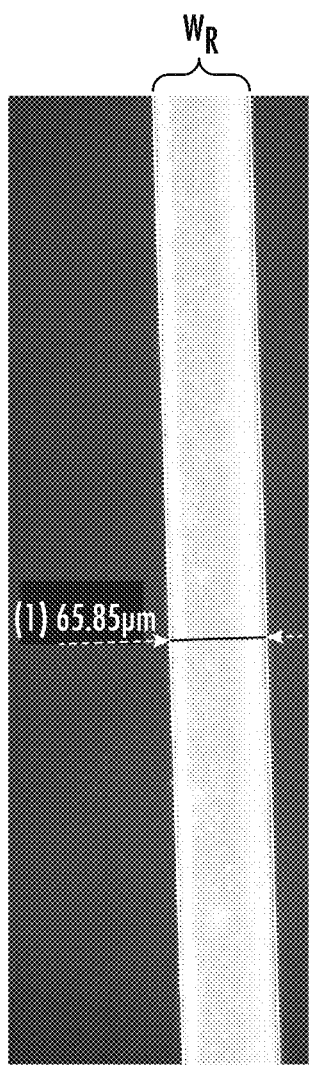
Figure 15:
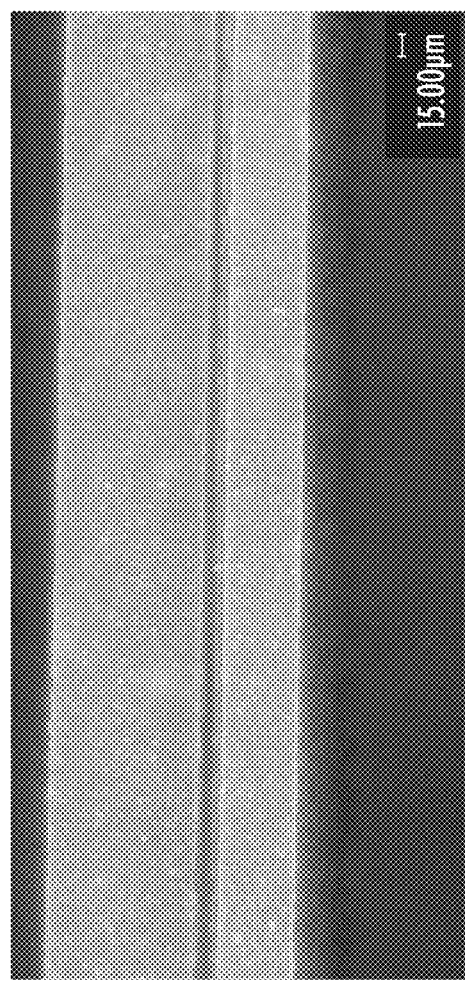
Figure 16:
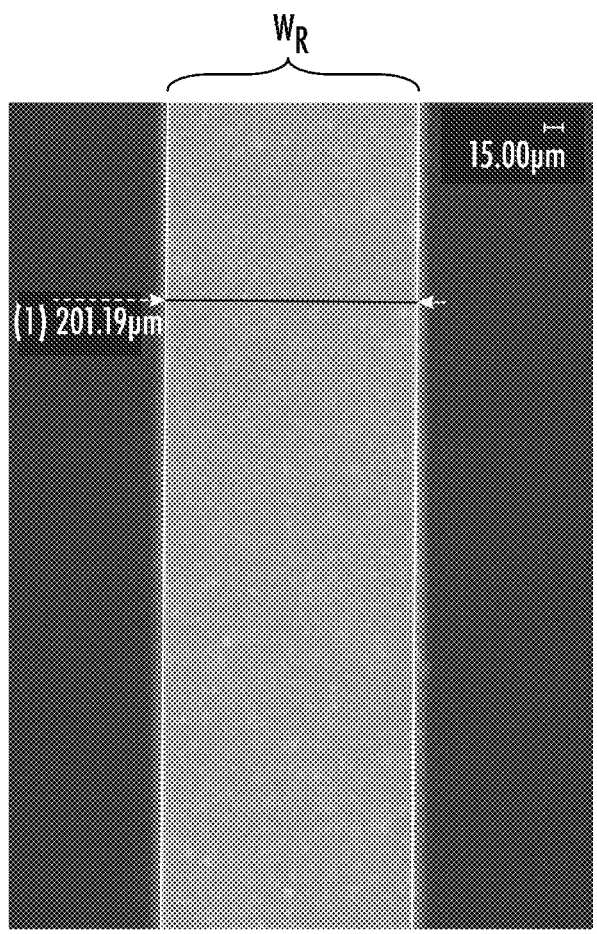
Figure 17:
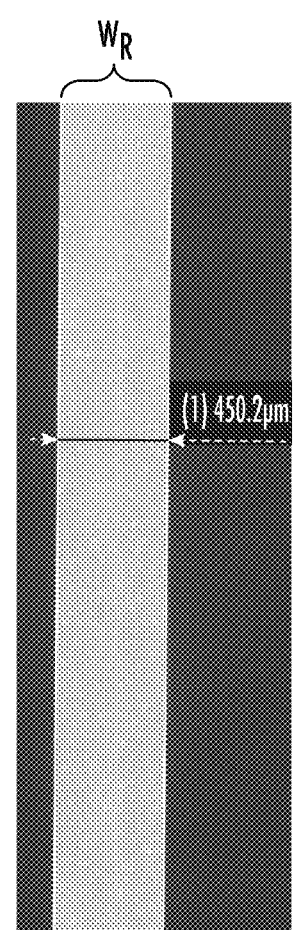
Figure 18:
FIG. 18 is a photograph illustrating ceramic ribbons 110 formed on a ceramic sheet.

FIGS. 12-17 are photographs of long, thin ribbons of ceramic material made in accordance with the various aspects of the disclosure. More specifically, FIGS. 12-17 are photographs of ceramic ribbons including high purity alumina in accordance with the various aspects of the disclosure. FIG. 12 is a photograph of a top view of a ceramic ribbon with a thickness of about 80 microns and a width $W_R$ of about 107 microns (e.g., 107.24 microns). FIG. 13 is a photograph of a ceramic ribbon with a thickness of about 40 microns and a width of about 65 microns (e.g., 65.85 microns). FIG. 14 is a photograph of a ceramic ribbon with a thickness of about 40 microns and a width $W_R$ of about 65 microns. FIG. 15 is a photograph of two ceramic ribbons with a thickness of about 40 microns each. FIG. 16 is a photograph of a top view of a ceramic ribbon with a thickness of about 40 microns and a width $W_R$ of about 200 microns (e.g., 200.19 microns). FIG. 17 is a photograph of a ceramic ribbon with a thickness of about 40 microns and a width $W_R$ of about 450 microns (e.g., 450.2 microns).

Methods for Manufacturing Narrow Ceramic Components from Wide Ceramic Ribbon

In additional aspects, ceramic components, such as those used for THz waveguides, particularly components made from a sintered ceramic material, and related manufacturing methods, are provided.

In general, an alumina ceramic ribbon having a long length and narrow form factor is useful for a few different applications. For example, a THz waveguide utilizes sub-mm wide strips having lengths of multiple meters. Some high temperature superconductor substrate utilizes ribbons having widths in the millimeters and lengths of hundreds of meters long. Certain printed sensor designs utilize ribbons having widths in the tens of millimeters and lengths in the tens of meters. For various applications, widths can be varied from sub-mm to a few mm or tens of mm.

Applicant believes that singulation of ribbon ceramic roll into narrow long strips is a new process opening up new processing and product areas. While it may be possible to produce ceramic components having the form factor discussed herein mainly through post sintering slitting, either by mechanical dicing (which provides low cost and easy access) or laser ablation (which provides high precision), as discussed herein, in relation to FIGS. 22-29, Applicant has developed a process and green tape article that singulates/modulates the wide ceramic web at green state into desired width (including firing shrinkage). In various embodiments, slitting depth could be controlled as either partial or completely through ceramic to achieve a desired shape performance. In some embodiments, shrinkage at the firing/sintering step could separate the slitted strips along the slits. In some embodiments, a layer of polymer coating (acrylic) is applied at green tape surface to help handling fluffy green tape in slitting process and will be removed in binder burnout process.

The new process discussed in relation to FIGS. 22-29 herein is believed to provide a variety of potential benefits. The process discussed in relation to FIGS. 22-29 is a "batch" process for making narrow ribbon ceramic strips. In this process, many narrow ceramic strips can be sintered in the same firing cycle, and thus, cost of operation can be improved as compared to the single narrow strip firing process. The process discussed in relation to FIGS. 22-29 provides "in-situ" fabrication of narrow ribbon ceramic strips, which is believed to provide significant cost saving compared to processes that utilize post-sintering singulation, where an expensive laser micromachining process might be used.

The process discussed in relation to FIGS. 22-29 performs tape slitting while the ceramic ribbon is in the green state, while the material is soft and has not been sintered. This allows for a relatively low cost mechanical slitting process/equipment to be utilized. As compared to post-sintering mechanical slitting, sintering after slitting produces as-sintered edges with less edge quality concerns, where slitting defects/flaws could be healed during sintering and thus, maintain good edge strength. The process discussed in relation to FIGS. 22-29 adds a layer of polymer coating on the green tape, which could mitigate handling challenges typically associated with handling delicate green tape and may also improve slitting quality. Further, the process discussed in relation to FIGS. 22-29 provides for controlling slitting depth on the green tape, and this slitting depth control is believed to allow for control of edge curl by modulating cross web connection, compared to single narrow strip firing.

The process discussed in relation to FIGS. 22-29 may allow for the production of narrow (e.g., low width) ceramic ribbons. Narrower ribbons are believed to have less total shrinkage (actual distance) compared to wider ribbons, and therefore, less stress is generated in narrow ribbons during sintering because the size change from the green ribbon state to fired/sintered state tends to be very small. This lower magnitude of width, thickness and/or length change may be advantageous for reducing undesired characteristics, such as shape deviations, edge curl, flatness issues, etc. In other words, overall shrinkage percentage will not change much compared to sintering of wider ribbons, but the absolute change of width or thickness from green ribbon state to fired/sintered ribbon will be reduced significantly. By way of example, a 100 mm wide ribbon that experiences a 20% shrinkage will end as an 80 mm wide sintered ribbon, and thus has a 20 mm width change; a 10 mm wide ribbon that experiences a 20% shrinkage will end as an 8 mm wide sintered ribbon, and thus has a 2 mm width change; and a 1 mm wide ribbon that experiences a 20% shrinkage will end as a 0.8 mm wide sintered ribbon, and thus has a 0.2 mm width change In general, the process discussed in relation to FIGS. 22-29 utilizes inline slitting of a thin ribbon to increase overall equipment effectiveness and make the process start and finish more like a standard wide ribbon run. Having the ability to control slitting depth and width as desired for a particular application enables multiple ribbon widths to be made on the same roll simply by disengaging the rollers, changing the width between slitting blades and re-engaging the rollers. The sections having different widths may be separated by a wide (un-slitted) ribbon section, which can stabilize the web and separate the sections. The process discussed in relation to FIGS. 22-29 enables the multi-pass process by keeping some material un-slit at each end for threading of the material from a spool and through the furnace.

Another advantage of the process discussed in relation to FIGS. 22-29 is that due to variable shrinkage from lot to lot or even within a roll of green tape, pre-slitting the entire roll can result in a complete loss of product due to incorrect final width. With inline slitting width control, the process discussed in relation to FIGS. 22-29 may include a feedback loop from the ribbon size at the exit of the furnace to the slitting blades to change the slitting width slightly to keep the final width within a desired tolerance to increase yields.

Some processes may also utilize parallel processing of narrow ribbons with shaped profiles. In such processes, parallel extrusion of narrow ribbons onto a carrier, followed by coating with an acrylic layer may provide processing of ribbons of a non-rectangular cross-section. As discussed in more detail below, the acrylic layer may allow for convenient handling of the ribbon array in the green state (see FIG. 27).

Figure 22:
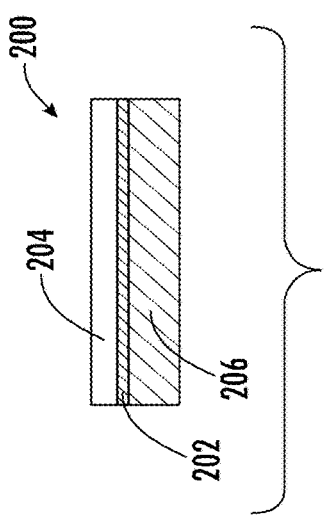
FIG. 22 is a cross-sectional view of a multilayer ceramic green tape, according to an exemplary embodiment.

Referring specifically, to FIGS. 22-25, a slitting process for a modulated green ceramic tape is shown according to an exemplary embodiment. Referring to FIG. 22, a cross-sectional view of a multilayer green ceramic tape 200 is shown according to an exemplary embodiment. A layer of polymer coating, shown as acrylic coating 202, is provided on green ceramic tape 204 above carrier film 206 during casting. In specific embodiments, acrylic coating 202 has a thickness of about 20 µm, green ceramic tape 206 has a thickness of 60 µm to 100 µm and carrier file has a thickness of about 80 µm. Green ceramic tape 204 could be very fluffy and challenging to handle, particularly for narrow slitting prior to firing/sintering, and thus, Applicant believes that a layer of polymer coating, such as acrylic coating 202, can hold green tape and facilitate slitting process. In this process, acrylic coating 202 will stay with green tape after carrier film 206 detaches and it is removed in the binder burnout process (as shown in FIG. 26).

Figure 23:
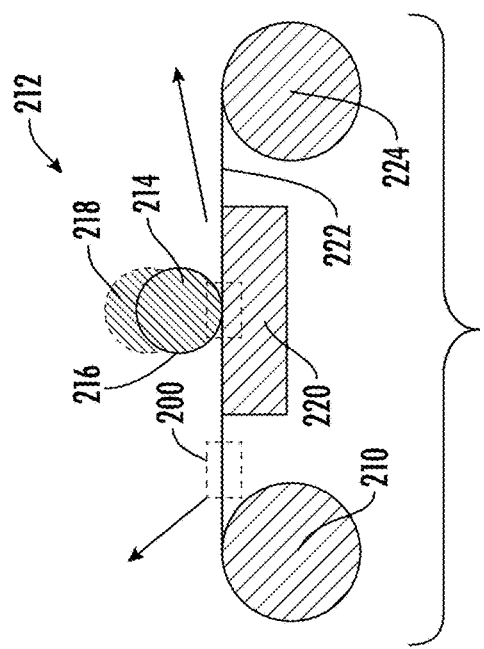
FIG. 23 is a schematic view of slitting process for the multilayer ceramic green tape of FIG. 22, according to an exemplary embodiment.

Referring to FIG. 23, a system and method for slitting multilayer green ceramic tape 200 is shown. In general, multilayer green ceramic tape 200 is unrolled from a spool 210. Next, multilayer green ceramic tape 200 moves through a slitting station 212. At slitting station 212, a roller 214 moves between an engaged position 216 and a disengaged position 218. When roller 214 is in the engaged position, slits are formed in multilayer green ceramic tape 200 via a slitting board 220. Following slitting, multilayer slitted green ceramic tape 222 may be wound onto a spool 224.

Figure 24:
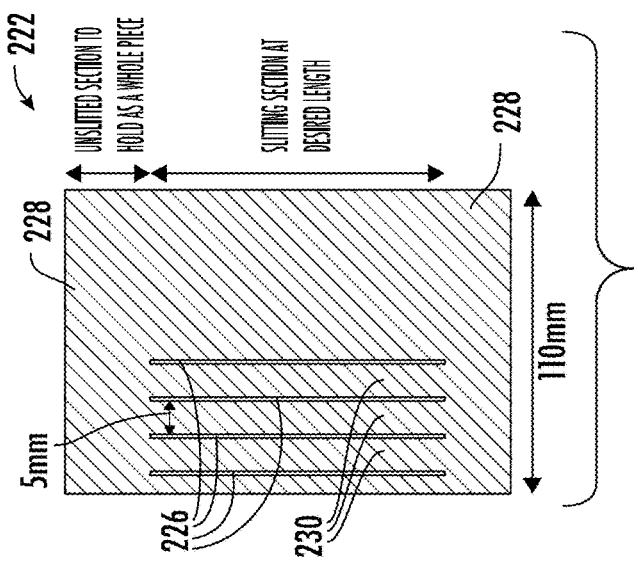
FIG. 24 is a top plan view of a multilayer ceramic green tape following slitting, according to an exemplary embodiment.
Figure 25:
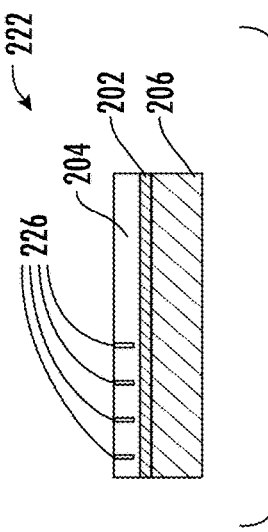
FIG. 25 is a cross-sectional view of a multilayer ceramic green tape following slitting, according to an exemplary embodiment.
Figure 26:
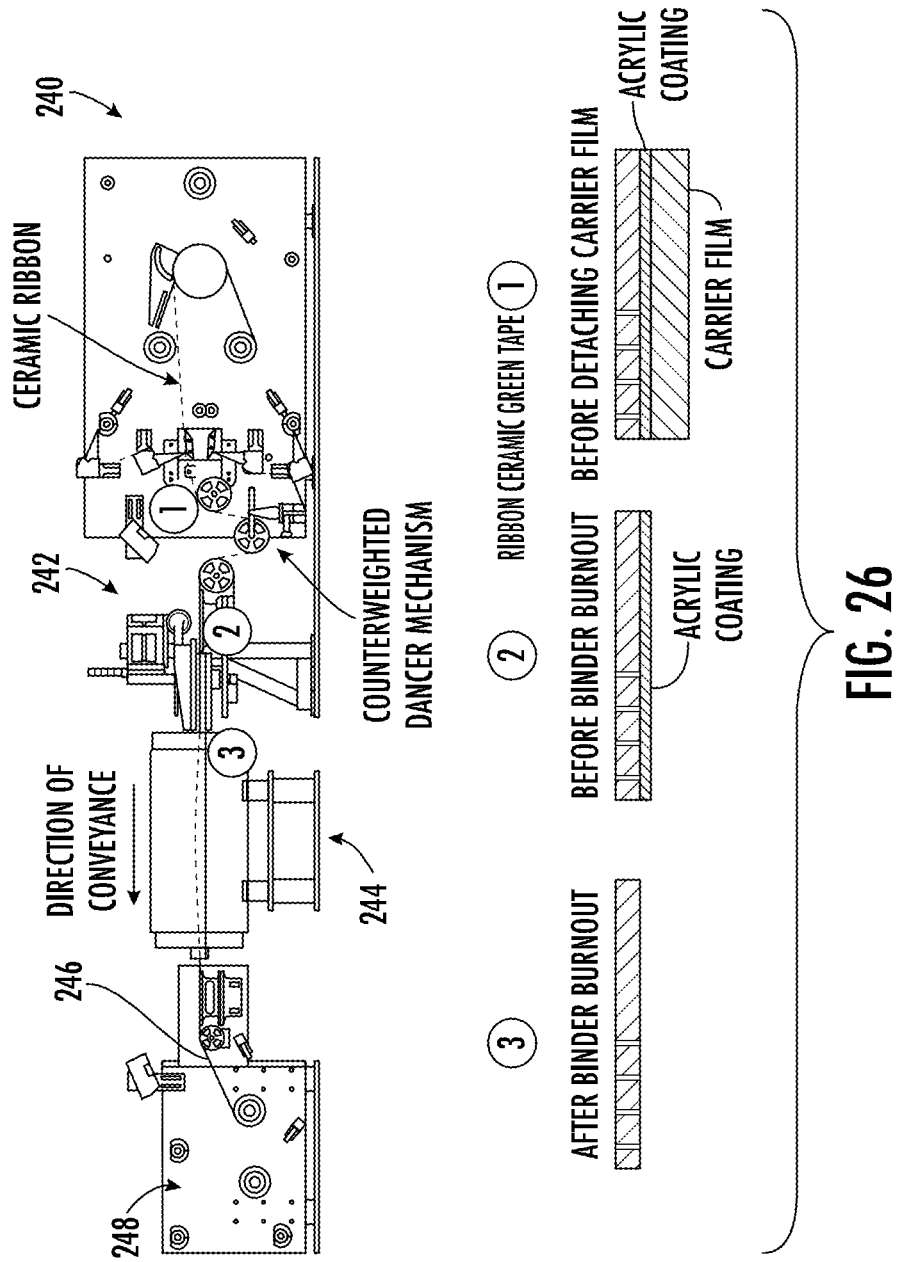
FIG. 26 shows a system for sintering a multilayer ceramic green tape following slitting, according to an exemplary embodiment.

Referring to FIGS. 24 and 25, multilayer slitted green ceramic tape 222 is shown according to an exemplary embodiment. As shown in FIGS. 24 and 25, multilayer slitted green ceramic tape 222 includes slits 226 formed in green ceramic tape 204 (FIG. 25). Exemplary dimensions for slit spacing and green tape width are shown in FIG. 24, but other dimensions may be utilized for particular applications.

It should be understood that different widths/slit spacing can be achieved by alternating distance between cutting blades within slitting station 212. Further, lengths of the final ribbon can be controlled by engaging-disengaging cutting blades to green tape, e.g., via movement of roller 214 between the engaged position 216 and the disengaged position 218 as shown in FIG. 23. In some processes, a certain length of un-slitted sections 228 (FIG. 24) is provided at the front and rear of tape 200. These un-slitted sections 228 (FIG. 24) may hold the tape as a whole piece during firing, so web tension can be applied to these narrow strips. In some embodiments, as shown in FIG. 25, slit depth is controlled to not pass completely through ceramic green tape 204. In such embodiments, strips 230 (FIG. 24) are not fully separated from each other at this step. It is believed that the remaining connection among strips 230 may minimize the edge curl that could otherwise develop during firing/sintering.

Referring to FIGS. 22-26, a system and process for sintering multilayer slitted green ceramic tape 222 (see FIGS. 23 and 24) is shown according to an exemplary embodiment. In general, multilayer slitted green ceramic tape 222 (see FIGS. 23 and 24) will be fed through an unwinding assembly 240 (see FIG. 26), and carrier film 206 (see FIGS. 22 and 25) will be separated from green ceramic tape 204 (see FIGS. 22 and 25) before binder burnout. In this embodiment, the attached acrylic coating layer 202 (see FIGS. 22 and 25) continues to hold the slitted ceramic green tape 204 (see FIGS. 22 and 25), and acrylic coating layer 202 (see FIGS. 22 and 25) is removed at binder burnout unit 242 (see FIG. 26). After separation of carrier film 206 (see FIGS. 22 and 25), the remaining layers of tape 222 (see FIGS. 23 and 24) goes through a firing furnace 244 (see FIG. 26). As noted above, shrinkage during sintering may act to separate strips across the whole length. Final fired strips 246 (see FIG. 26) exiting furnace 244 (see FIG. 26) are wound at winder assembly 248 (see FIG. 26). As noted above, in some embodiments, the presence of un-slitted sections 228 (see FIG. 24) holds strips 230 (see FIG. 24) together allowing them to be wound together following sintering.

Figure 27:
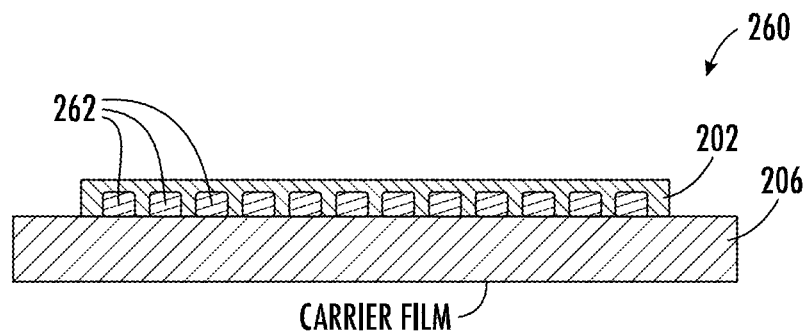
FIG. 27 is a cross-sectional view of a multilayer ceramic green tape, according to another exemplary embodiment.

Referring to FIG. 27, a multilayer green ceramic tape 260 is shown according to an exemplary embodiment. Multilayer green ceramic tape 260 is substantially the same as multilayer green ceramic tape 200, as shown in FIG. 22, except for the differences discussed herein. Multilayer green ceramic tape 260 includes a parallel array of ceramic ribbons 262 supported on carrier film 206 and surrounded by acrylic coating 202. In some such embodiments, ceramic ribbons 262 are extruded to have a desired cross-sectional shape, and in the specific embodiment shown in FIG. 27, the parallel array of ceramic ribbons 262 may have an extrusion cross-section shape with rounded corners.

In various embodiments, the desired narrow-width flexible ceramic ribbon can be obtained from a wider width ribbon (e.g., following slit formation as discussed above) in at least three different portions of the sintering process shown in FIG. 26. Thus, in various embodiments, the individual ceramic sections 230 may be separated from each other 1) before burnout/sintering, 2) during burnout/sintering, or 3) after the complete sintering process.

Figure 28:
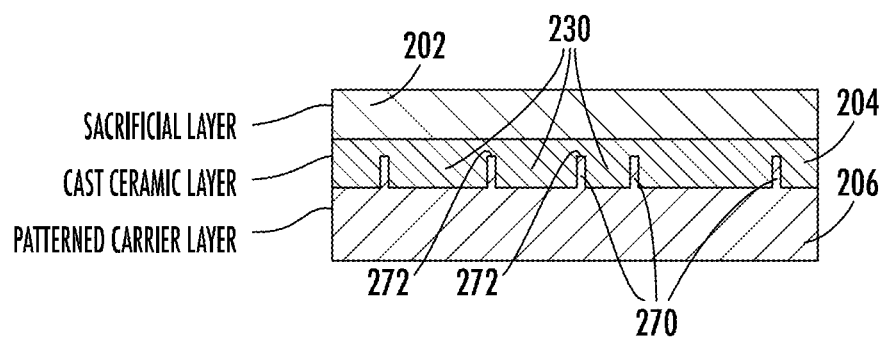
FIG. 28 is a cross-sectional view of a multilayer ceramic green tape, according to another exemplary embodiment.
Figure 29:
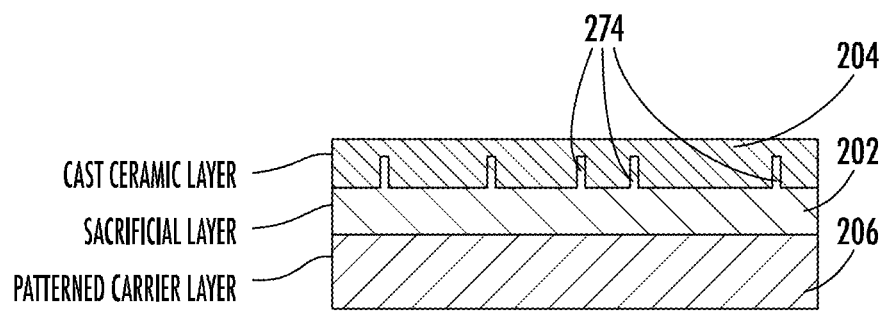
FIG. 29 is a cross-sectional view of a multilayer ceramic green tape, according to another exemplary embodiment.

Referring to FIGS. 28 and 29, designs of a multilayer green ceramic tape that provide for ceramic layer separation during the burnout/sintering phase are shown and described.

In some embodiments, a ceramic layer (e.g., layer 204 shown in FIG. 22) can be partially separated before entering the binder burnout unit 242 (FIG. 26). Alternatively, though, this partial separation or thickness modulation does not need to occur with a blade. As shown in FIGS. 28 and 29, the thickness reduction at the "slit" line can occur during the thin film casting.

In one design shown in FIG. 28, carrier film 206 itself can be embossed or patterned before casting. In this arrangement, carrier film 206 includes projections 270 that create thickness variations in the cast green ceramic material 204, shown as recessed areas 272, along the intended separation lines, between sections 230. This can then be overcoated by an acrylic or other sacrificial layer 202 for mechanical stability.

In another design shown in FIG. 29, sacrificial layer 202 itself can be patterned with printing or other methods forming projections 274 to create the same effect. This variation of ceramic thickness along the intended separation line can either be continuous or a series of discrete co-linear elements/perforations.

In various embodiments, after separating the carrier film 206 (see, e.g., FIG. 29), the ceramic and sacrificial stack are thermally processed. Separation of the ceramic layer can occur by the following individual or combined effects: 1) thermal expansion of the sacrificial layer before burn-out causes controlled fracture along the intended separation line, or 2) dimensional size reduction of the ceramic layer during sintering creates a mechanically weak line at the intended separation line. If the wider ceramic ribbon is separated into narrower webs within the sintering process, separate winding units may be used at the exit to manage individual line tensions.

As an alternative to separation into multiple narrow webs within the sintering furnace, the ceramic ribbon can go through a final separation step after the sintering phase. This might enable a standard, stable process during sintering with an added separation step in ambient conditions.

In various embodiments, narrow ribbon separation (separation of sections 230 (FIG. 24) from each other) after sintering is provided. If a sintered ceramic ribbon exits the furnace zone with patterned line defects, it can then be conveyed over a roller or rollers meant to create cross-web tension. This can be localized separation of the wide ribbon into narrower portions along the intended separation lines. Examples of these rollers are crowned, expander, stretcher, bowed, or "wrinkle eliminating" rollers. After conveyance over these rollers, the ceramic layer can be separated and multiple winding units may be used to control individual line tensions.

Similar to the expander roller approach to create final separation of the ceramic ribbon, the fully sintered ceramic ribbon can first be temporarily laminated to a polymer carrier. While on the polymer carrier, the stack can then go through a cross-web stretching process. This cross-web stretching will create sufficient lateral tension to continuously separate the segments 230 (FIG. 24) of the ceramic ribbon as described above. In some embodiments, the segments 230 may be temporarily attached to a carrier web. This allows for use a single winding unit winding station 248 (FIG. 26) that controls a single (carrier web) tension. This single carrier web (with temporarily attached narrow ceramic webs) can then be wound onto a single spool. At a later convenient time, the narrow ceramic ribbon portions can be removed individually or in multiple groups as convenient.

In some embodiments, a laser can be used to create the final separation of the narrow ribbons formed from segments 230. Because of slits 226 (FIGS. 24 and 25), the laser for separation can be a lower cost/lower maintenance laser than one that may be needed for full ribbon ablation/cutting. It could be a lower cost unit suitable for partial ribbon ablation. It could also be a laser such as $CO_2$ that generates localized thermal stress in the ceramic ribbon. The localized thermal stress can controllably propagate a fracture along the intended separation line defects. The ceramic layer will be separate and multiple winding units may be required to control individual line tensions.

In some embodiments, if the ceramic ribbon is fully separated before leaving the sintering zone, it can be attached to a temporary carrier web. This single carrier web (with temporarily attached narrow ceramic webs) can then be wound onto a single spool. At a later convenient time, the narrow-web ceramic portions can be removed individually or in multiple groups as convenient for web handling.

In the present disclosure, use of the singular includes the plural except where specifically indicated.

The present described technology is now described in such full, clear, concise, and exact terms as to enable any person skilled in the art to which it pertains to practice the same. It is to be understood that the foregoing described preferred aspects of the technology and that modification may be made therein without departing from the spirit or scope of the invention as set forth in the appended claims. The scope of the following claims is to be accorded the broadest interpretation so as to encompass all such modifications and equivalent structures and functions. Therefore, it is intended that the application not be limited to the particular aspects disclosed, but that the application will include all aspects falling within the scope of the appended claims.

What is claimed is:

1. A waveguide configured for guiding electromagnetic signals, comprising:
   a core formed from a first material, the core having a length of at least 3 cm and a cross-sectional dimension, orthogonal to the length and fully spanning the core through a geometric centroid of the core, in a range of 10 microns to 500 microns;
   wherein the first material is a ceramic having a dielectric constant ($Dk_1$), and
   a cladding layer formed from a second material, different than the first material, having a dielectric constant ($Dk_2$), the cladding layer coupled to and surrounding an outer peripheral surface of the core along a length of the core, wherein the second material is a polymer material having an inner surface directly coupled to the outer peripheral surface of the core, and wherein the cladding layer has thickness in the range of 0.1 mm to 10 mm;
   wherein $Dk_2 < Dk_1$.

2. The waveguide of claim 1, wherein the ceramic is polycrystalline and is sintered.

3. The waveguide of claim 2, wherein the ceramic comprises alumina of purity greater than 99.9%, and wherein an average grain size of the alumina is less than 2 μm.

4. The waveguide of claim 1, wherein the length is at least 10 cm.

5. The waveguide of claim 1, wherein $Dk_1$ is between 5 and 50.

6. A waveguide configured for guiding electromagnetic signals, comprising:
   a core formed from a first material, wherein the first material is a polycrystalline ceramic having a dielectric constant ($Dk_1$), the core having a non-circular cross-sectional shape, a cross-sectional area of less than 10 mm$^2$ and a length orthogonal to the cross-section of at least 10 cm; and
   a cladding layer formed from a polymer material having a dielectric constant ($Dk_2$), the cladding layer coupled to and fully surrounding an outer peripheral surface of the core;
   wherein $Dk_2$ is less than $Dk_1$;
   wherein $Dk_1$ is between 5 and 50; and
   wherein the core and the polymer material of the cladding exhibit dielectric loss (Df) less than $10^{-3}$ at 100 GHz.

7. The waveguide of claim 6, wherein the core comprises a ribbon of sintered ceramic.

8. The waveguide of claim 7, wherein a width of the ribbon is greater than a thickness of the ribbon, and wherein the thickness of the ribbon is less than 100 μm.

9. The waveguide of claim 8, wherein the width of the ribbon is at least ten times the thickness of the ribbon.

10. The waveguide of claim 8, wherein the sintered ceramic comprises alumina.

11. The waveguide of claim 6, wherein the non-circular cross-sectional shape of the core is rectangular in cross-section.

12. A waveguide configured for guiding electromagnetic signals, comprising:
   a core formed from a first material, the core having a length of at least 3 cm and a cross-sectional dimension, orthogonal to the length and fully spanning the core through a geometric centroid of the core, in a range of 10 microns to 500 microns;

wherein the first material is a ceramic having a dielectric constant ($Dk_1$), and wherein the ceramic is polycrystalline and is sintered, and a cladding layer formed from a second material, different than the first material, having a dielectric constant ($Dk_2$), the cladding layer coupled to and surrounding an outer peripheral surface of the core along a length of the core;

wherein $Dk_2 < Dk_1$.

13. The waveguide of claim 12, wherein the second material is a polymer material having an inner surface directly coupled to the outer peripheral surface of the core.

14. The waveguide of claim 13, wherein the cladding layer has thickness in the range of 0.1 mm to 10 mm.

15. The waveguide of claim 14, wherein the length is at least 10 cm.

16. The waveguide of claim 12, wherein $Dk_1$ is between 5 and 50.

17. The waveguide of claim 12, wherein the ceramic comprises alumina of purity greater than 99.9%, and wherein an average grain size of the alumina is less than 2 μm.

18. A waveguide configured for guiding electromagnetic signals, comprising:

a core formed from a first material, the core having a length of at least 3 cm and a cross-sectional dimension, orthogonal to the length and fully spanning the core through a geometric centroid of the core, in a range of 10 microns to 500 microns;

wherein the first material is a ceramic having a dielectric constant ($Dk_1$), wherein the ceramic comprises alumina of purity greater than 99.9%, and wherein an average grain size of the alumina is less than 2 μm; and a cladding layer formed from a second material, different than the first material, having a dielectric constant ($Dk_2$), the cladding layer coupled to and surrounding an outer peripheral surface of the core along a length of the core;

wherein $Dk_2 < Dk_1$.

19. The waveguide of claim 18, wherein the second material is a polymer material having an inner surface directly coupled to the outer peripheral surface of the core.

20. The waveguide of claim 19, wherein the cladding layer has thickness in the range of 0.1 mm to 10 mm.

21. The waveguide of claim 20, wherein the length is at least 10 cm.

22. The waveguide of claim 18, wherein $Dk_1$ is between 5 and 50.

23. The waveguide of claim 18, wherein the ceramic is polycrystalline and is sintered.

* * * * *

UNITED STATES PATENT AND TRADEMARK OFFICE
CERTIFICATE OF CORRECTION

Page 1 of 1

PATENT NO. : 11,342,649 B2
APPLICATION NO. : 17/001909
DATED : May 24, 2022
INVENTOR(S) : Michael Edward Badding et al.

It is certified that error appears in the above-identified patent and that said Letters Patent is hereby corrected as shown below:

On the Title Page

Page 2, in Column 1, item [56], Line 5, delete "infared CO 2" and insert -- infrared $CO_2$ --.

Signed and Sealed this
Twenty-fifth Day of July, 2023

Katherine Kelly Vidal
*Director of the United States Patent and Trademark Office*